US009396325B2

(12) United States Patent
Kendall

(10) Patent No.: US 9,396,325 B2
(45) Date of Patent: Jul. 19, 2016

(54) PROVISIONING AN APP ON A DEVICE AND IMPLEMENTING A KEYSTORE

(71) Applicant: Mocana Corporation, San Francisco, CA (US)

(72) Inventor: H. Richard Kendall, North Liberty, IN (US)

(73) Assignee: MOCANA CORPORATION, San Francisco, CA (US)

( * ) Notice: Subject to any disclaimer, the term of this patent is extended or adjusted under 35 U.S.C. 154(b) by 0 days.

(21) Appl. No.: 14/167,418

(22) Filed: Jan. 29, 2014

(65) Prior Publication Data

US 2014/0208100 A1    Jul. 24, 2014

Related U.S. Application Data

(63) Continuation-in-part of application No. 14/046,687, filed on Oct. 4, 2013, which is a continuation-in-part of application No. 13/527,321, filed on Jun. 19, 2012, now Pat. No. 8,769,305, which is a continuation-in-part of application No. 13/309,387, filed on Dec. 1, 2011, now Pat. No. 8,812,868, which is a continuation-in-part of application No. 13/052,973, filed on Mar. 21, 2011, now Pat. No. 8,955,142.

(60) Provisional application No. 61/758,486, filed on Jan. 30, 2013.

(51) Int. Cl.
G06F 21/62 (2013.01)
G06F 21/52 (2013.01)
H04L 9/08 (2006.01)
H04W 12/06 (2009.01)
G06F 21/53 (2013.01)

(Continued)

(52) U.S. Cl.
CPC .............. *G06F 21/52* (2013.01); *G06F 21/53* (2013.01); *G06F 21/6281* (2013.01); *H04L 9/0863* (2013.01); *H04W 12/06* (2013.01); *G06F 2221/2149* (2013.01); *H04L 63/083* (2013.01); *H04W 12/08* (2013.01)

(58) Field of Classification Search
None
See application file for complete search history.

(56) References Cited

U.S. PATENT DOCUMENTS 6,577,735 B1 * 6/2003 Bharat .......................... 380/286
6,959,382 B1 * 10/2005 Kinnis et al. ................. 713/170

(Continued)

FOREIGN PATENT DOCUMENTS

WO    WO 2011057393    5/2011

OTHER PUBLICATIONS

Nukona App Center, "Everything You Need to Secure, Deploy and Manage Your Apps on Personal Devices", https://www.nukona.com/products, Jul. 7, 2011.

(Continued)

*Primary Examiner* — Hadi Armouche
*Assistant Examiner* — Malcolm Cribbs
(74) *Attorney, Agent, or Firm* — Rupak Nag

(57) ABSTRACT

A keystore is installed on a mobile app where the keystore is created and provisioned on a server, such as an app wrapping server, under the control of an enterprise. A generic (non-provisioned) wrapped app is installed on a device. The app prompts the user to enter a passphrase. When the user does this, an app keystore is created. It has a user section and a table of contents. The keystore files are hashed, creating "first" keystore hash values. The first keystore hash values are stored in the TOC. The TOC is then hashed, creating a TOC hash value. The passphrase entered by the user is then combined with the TOC hash value. This creates a "first" master passphrase for the keystore. The keystore is then transmitted to the device where it is installed in the generic (non-provisioned) wrapped app.

8 Claims, 20 Drawing Sheets

(51) Int. Cl.
*H04L 29/06* (2006.01)
*H04W 12/08* (2009.01)

(56) References Cited

U.S. PATENT DOCUMENTS

| | | | |
|---|---|---|---|
| 7,130,951 B1 | 10/2006 | Christie et al. | |
| 7,213,237 B2 | 5/2007 | Kobayashi | |
| 7,243,230 B2 | 7/2007 | England et al. | |
| 7,421,586 B2 | 9/2008 | Luo et al. | |
| 7,603,551 B2 | 10/2009 | McGrath et al. | |
| 7,669,186 B2 | 2/2010 | Nolan et al. | |
| 7,823,135 B2 | 10/2010 | Horning et al. | |
| 7,877,613 B2 | 1/2011 | Luo | |
| 7,895,580 B1 | 2/2011 | Nikolov | |
| 7,941,700 B2 | 5/2011 | Schlesinger et al. | |
| 8,413,210 B2 | 4/2013 | Kuzin et al. | |
| 8,433,895 B1 | 4/2013 | Sobel et al. | |
| 8,490,191 B2 | 7/2013 | Kuegler et al. | |
| 8,656,501 B2 | 2/2014 | Gnahm | |
| 8,818,897 B1* | 8/2014 | Slodki et al. | 705/51 |
| 2002/0069263 A1 | 6/2002 | Sears et al. | |
| 2003/0084298 A1* | 5/2003 | Messerges et al. | 713/176 |
| 2003/0196102 A1* | 10/2003 | McCarroll | 713/194 |
| 2005/0050330 A1 | 3/2005 | Agam et al. | |
| 2006/0120526 A1 | 6/2006 | Boucher et al. | |
| 2006/0156026 A1 | 7/2006 | Utin | |
| 2006/0184927 A1* | 8/2006 | Deblaquiere et al. | 717/168 |
| 2006/0242406 A1 | 10/2006 | Barde et al. | |
| 2007/0050781 A1 | 3/2007 | Furuichi et al. | |
| 2007/0118558 A1 | 5/2007 | Kahandaliyanage | |
| 2007/0180450 A1 | 8/2007 | Croft et al. | |
| 2007/0192864 A1 | 8/2007 | Bryant et al. | |
| 2007/0255943 A1 | 11/2007 | Kern et al. | |
| 2008/0046965 A1 | 2/2008 | Wright et al. | |
| 2009/0006868 A1 | 1/2009 | Alkove et al. | |
| 2009/0007081 A1 | 1/2009 | Lau et al. | |
| 2009/0048978 A1 | 2/2009 | Ginter et al. | |
| 2009/0292893 A1 | 11/2009 | Henry et al. | |
| 2010/0057731 A1* | 3/2010 | Kasai | 707/5 |
| 2011/0145926 A1 | 6/2011 | Dalcher et al. | |
| 2011/0185186 A1 | 7/2011 | Adams et al. | |
| 2011/0246782 A1 | 10/2011 | MacKay et al. | |
| 2011/0282995 A1 | 11/2011 | Gass et al. | |
| 2011/0283269 A1 | 11/2011 | Gass et al. | |
| 2011/0296391 A1 | 12/2011 | Gass et al. | |
| 2012/0167162 A1* | 6/2012 | Raleigh et al. | 726/1 |
| 2012/0210443 A1 | 8/2012 | Blaisdell et al. | |
| 2012/0331550 A1 | 12/2012 | Raj et al. | |
| 2013/0024695 A1 | 1/2013 | Kandrasheu et al. | |
| 2013/0091543 A1 | 4/2013 | Wade et al. | |
| 2013/0318357 A1* | 11/2013 | Abraham et al. | 713/176 |
| 2014/0033193 A1* | 1/2014 | Palaniappan | 717/173 |
| 2014/0040873 A1* | 2/2014 | Goldman | 717/168 |
| 2014/0173700 A1 | 6/2014 | Awan et al. | |
| 2014/0331297 A1 | 11/2014 | Innes et al. | |
| 2014/0337628 A1 | 11/2014 | Amato | |

OTHER PUBLICATIONS

Good Technology, Inc., "Taking Secure Steps to Enterprise Mobility—on the Most Popular Devices", http://www.good.com/products, Jul. 7, 2011.

Lookout Mobile Security, https://www.mylookout.com/download, Apr. 2010.

Android Community, "Amazon App Store Lures You in With Free Apps, Makes You Stay if You Want to Keep Them", http://androidcommunity.com/amazon-app-store-lures-you-in-with-free-apps-makes-you-stay-if-you-want-to-keep-them-20110614/?utm_medium=referral&utm_source=pulsenews, pp. 1-2, Jul. 13, 2011.

International Search Report dated May 21, 2012 from International Application No. PCT/US 12/24655.

Written Opinion dated May 21, 2012 from International Application No. PCT/US12/24655.

U.S. Office Action dated May 10, 2013 from U.S. Appl. No. 13/052,973.

U.S. Office Action dated Aug. 30, 2013 from U.S. Appl. No. 13/527,321.

U.S. Office Action dated Oct. 24, 2013 from U.S. Appl. No. 13/309,387.

U.S. Final Office Action dated Jan. 2, 2014 from U.S. Appl. No. 13/052,973.

Notice of Allowance dated May 14, 2014 from U.S. Appl. No. 13/052,973.

Notice of Allowance dated May 15, 2014 from U.S. Appl. No. 13/527,321.

Notice of Allowance dated Jun. 8, 2014 from U.S. Appl. No. 13/309,387.

U.S. Office Action dated Jun. 25, 2015 from U.S. Appl. No. 14/046,687.

U.S. Office Action dated Dec. 23, 2015 from U.S. Appl. No. 14/279,971.

U.S. Final Office Action dated Jan. 4, 2016 from U.S. Appl. No. 14/046,687.

* cited by examiner

PROVISIONING AN APP ON A DEVICE AND IMPLEMENTING A KEYSTORE

CROSS-REFERENCE TO RELATED APPLICATIONS

This application claims priority to U.S. Provisional Application No. 61/758,486, filed on Jan. 30, 2013, entitled "PROVISIONING AN APP ON A DEVICE AND IMPLEMENTING A KEYSTORE". This application is also a Continuation-in-Part which claims priority under 35 U.S.C. §120 to pending U.S. patent application Ser. No. 14/046,687, filed on Oct. 4, 2013, entitled "SECURE UNLOCKING AND RECOVERY OF A LOCKED WRAPPED APP ON A MOBILE DEVICE", which is a Continuation-in-Part claiming priority under 35 U.S.C. §120 to pending U.S. patent application Ser. No. 13/527,321, filed on Jun. 19, 2012, entitled "SECURE EXECUTION OF UNSECURED APPS ON A DEVICE", which is a Continuation-in-Part claiming priority under 35 U.S.C. §120 to pending U.S. patent application Ser. No. 13/309,387, filed on Dec. 1, 2011, entitled "SECURE EXECUTION OF UNSECURED APPS ON A DEVICE," which is a Continuation-in-Part of pending U.S. patent application Ser. No. 13/052,973, filed on Mar. 21, 2011, entitled "SECURE EXECUTION OF UNSECURED APPS ON A DEVICE," all which are hereby incorporated by reference in their entirety.

BACKGROUND OF THE INVENTION

1. Field of the Invention

The present invention relates generally to software and mobile devices. More specifically, it relates to preparing and customizing an app to have specific behavior on a mobile device.

2. Description of the Related Art

The overall objective is to enable employers to send out policy updates for security-wrapped apps in the most efficient and effective way. Employers also want efficient ways to transmit an initial set of policies to employees and, conversely, employees would like to have an error-free and seamless way of receiving initial policies from employers.

Presently, there is no way for an employer to know what precisely is being provisioned or to know specifics of how provisioning is done for apps distributed to its employees. For example, in one scenario employers may not know what is being stored in its employees' device keystores or where the data in the keystores originated from.

Presently, files that are injected into an "app bundle" that is security wrapped are verified by hashing the files and then embedding the hash values into a library used by a mobile app protection program. When the library starts and an app is being security-wrapped, files that are injected are re-hashed and compared to hash values stored in the library. If they match, the files have not been tampered with and the security-wrapping process continues.

One of the drawbacks of this approach of matching hash values is that it does not provide a way to verify files that are injected after the app has been security wrapped. Consequently, any policy change (file modification) for a user requires re-wrapping the app for the user with the new/updated policies and then re-installing it on the device. It would be desirable to be able to modify policy files after installing the wrapped app and still be able to easily detect if the file containing the policy has been tampered with. It would be desirable to enable dynamic updates to a user's policy without having to re-security wrap an app. Related to this, it would also be desirable to support different policies for different users on the "same installation of an app" on a specific device.

SUMMARY OF THE INVENTION

One aspect of the present invention is a method of installing a keystore in a mobile app where the keystore is created and provisioned on a server, such as an app wrapping server, under the control of an enterprise. A generic (non-provisioned) wrapped app is installed on the device. The app prompts the user to enter a passphrase. When the user does this, an app keystore is created on the server. This keystore has a user section and a table of contents ("TOC"). The keystore is made up of files. These keystore files are hashed, creating "first" keystore hash values. The first keystore hash values are stored in the TOC. The TOC is then hashed, creating a TOC hash value. The passphrase entered by the user is then combined with the TOC hash value. This creates a "first" master passphrase for the keystore. So far, all the activities regarding the keystore have been on the app wrapping server. The keystore is then transmitted to the device where it is installed in the generic (non-provisioned) wrapped app.

In one embodiment, the user and device specific policy files are embedded into the user section of the keystore on the app wrapping server. In another embodiment, when the user executes the app on the device, the user section of the TOC in the keystore is hashed. This creates a user section TOC hash value. This hashing is done by the app. The passphrase is also combined with the user section TOC hash value to create a "second" master passphrase. The keystore is hashed again thereby creating a second keystore hash value. The second keystore hash value is compared with the first keystore hash value. If the keystore hash values are the same, the user is able to execute the wrapped app in a normal manner.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
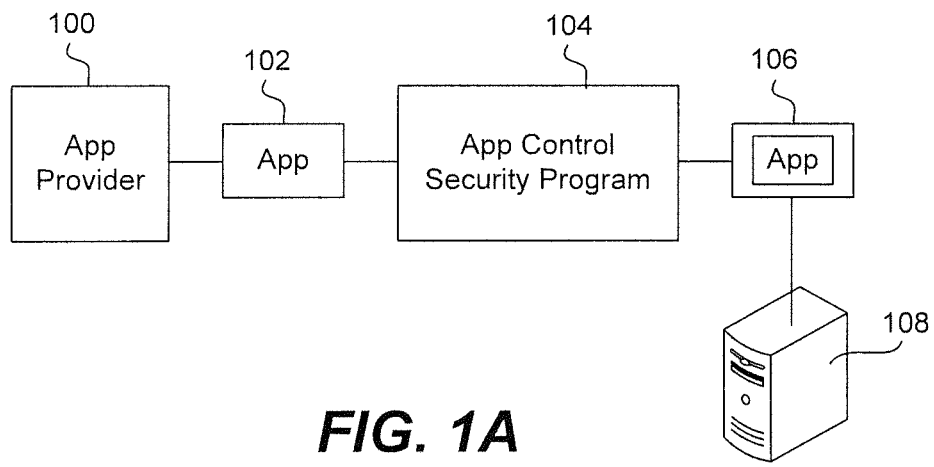
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
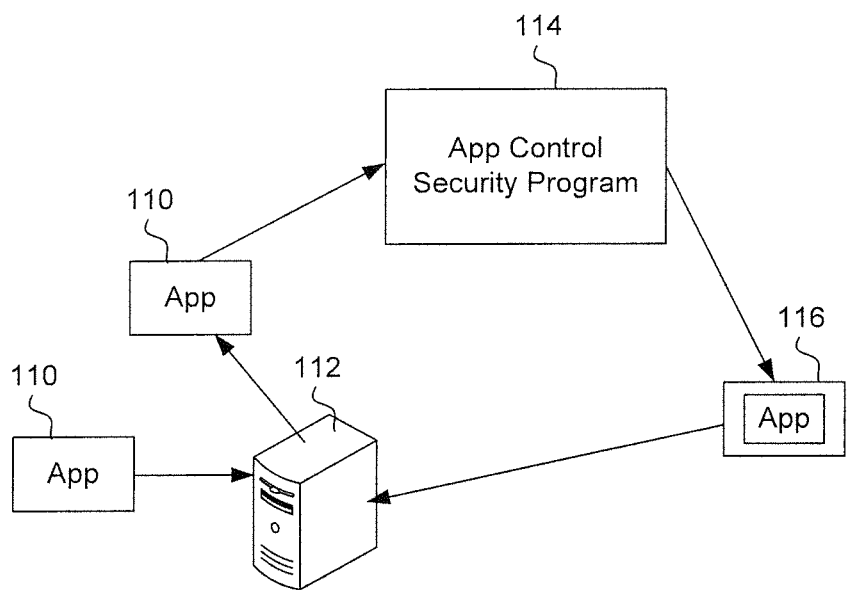
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
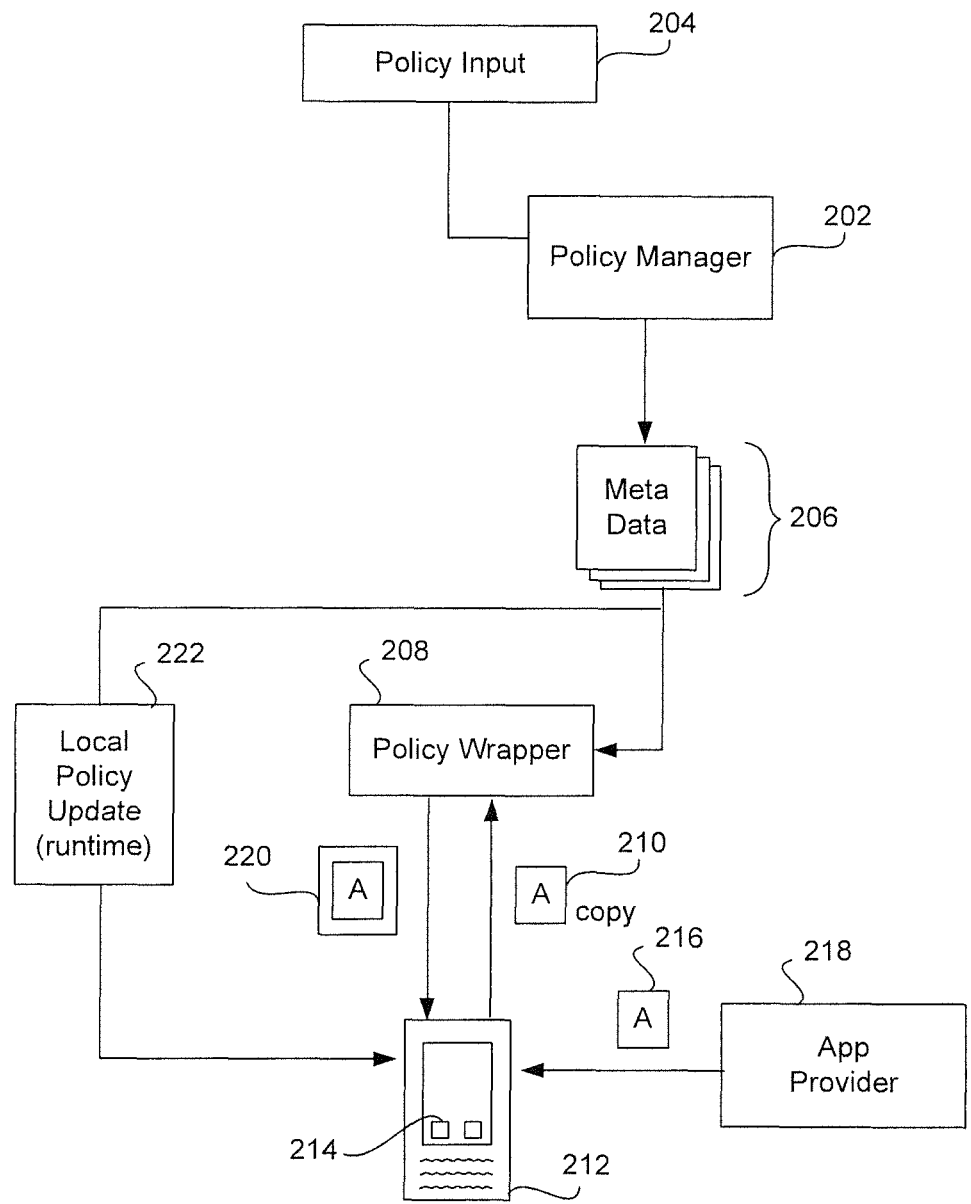
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g. "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
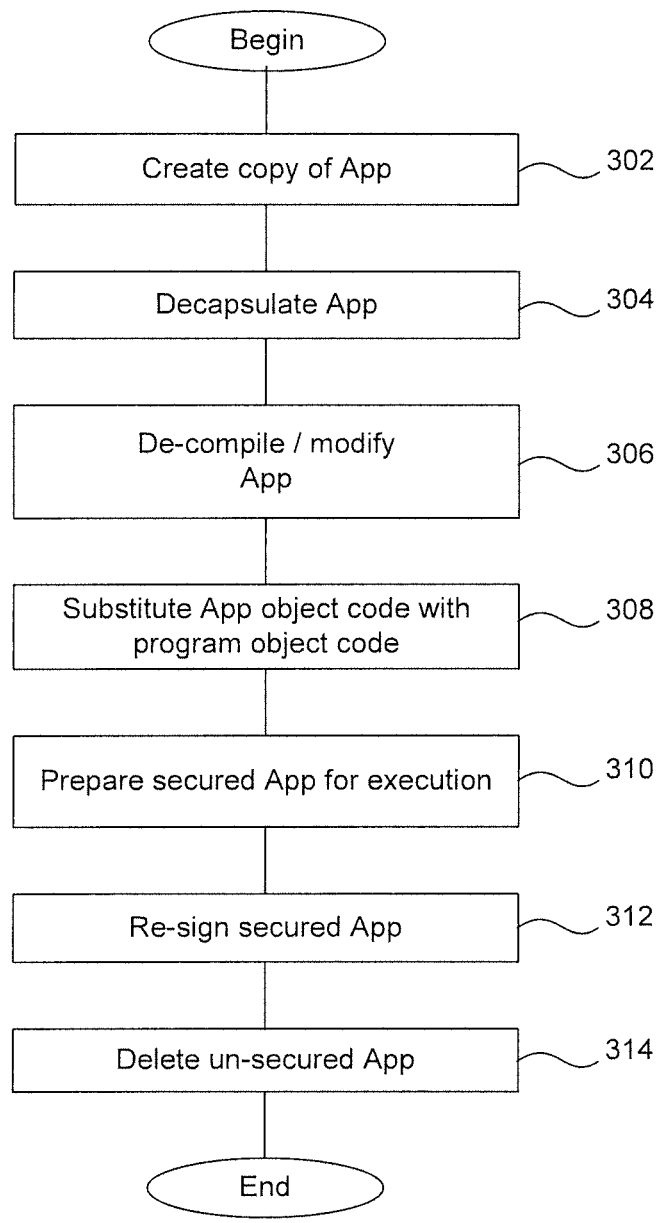
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
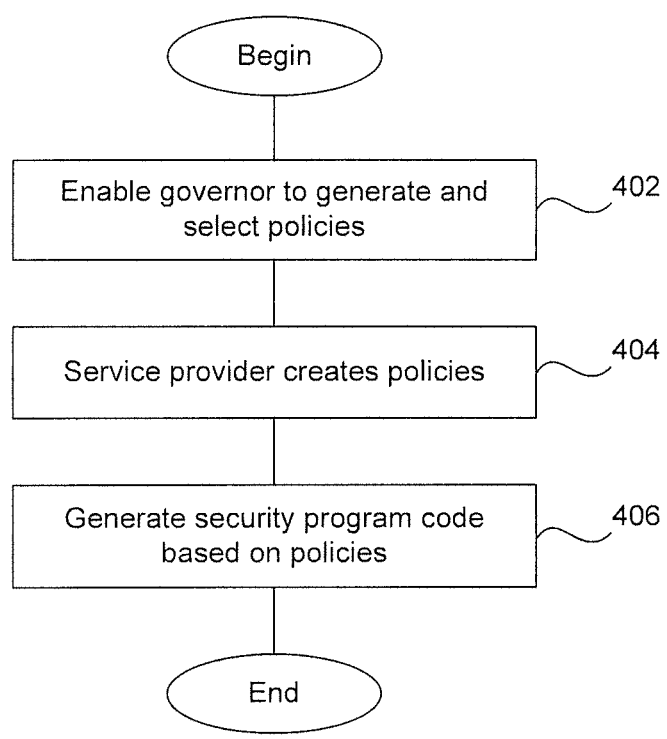
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
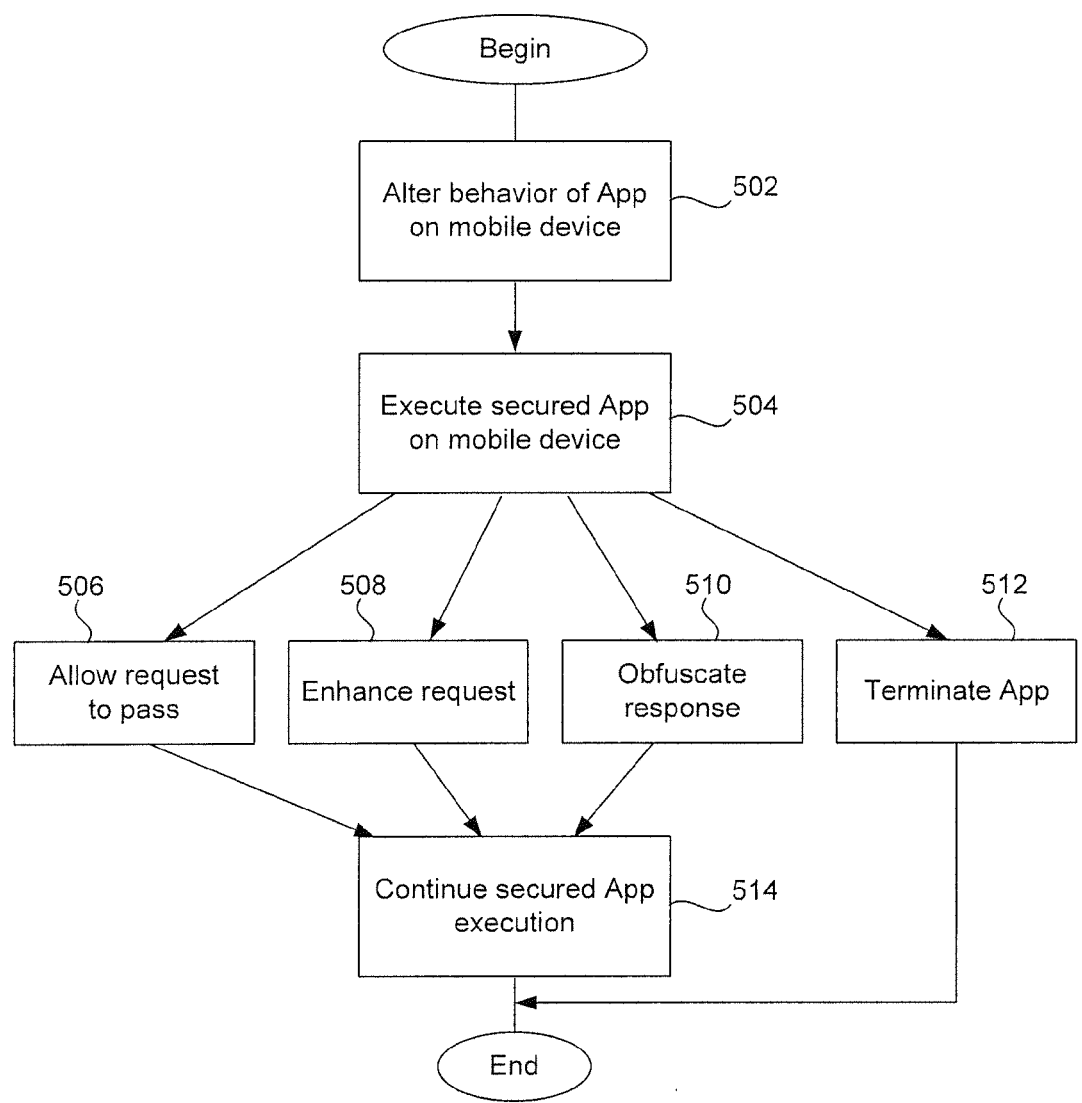
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g. smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby overexposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
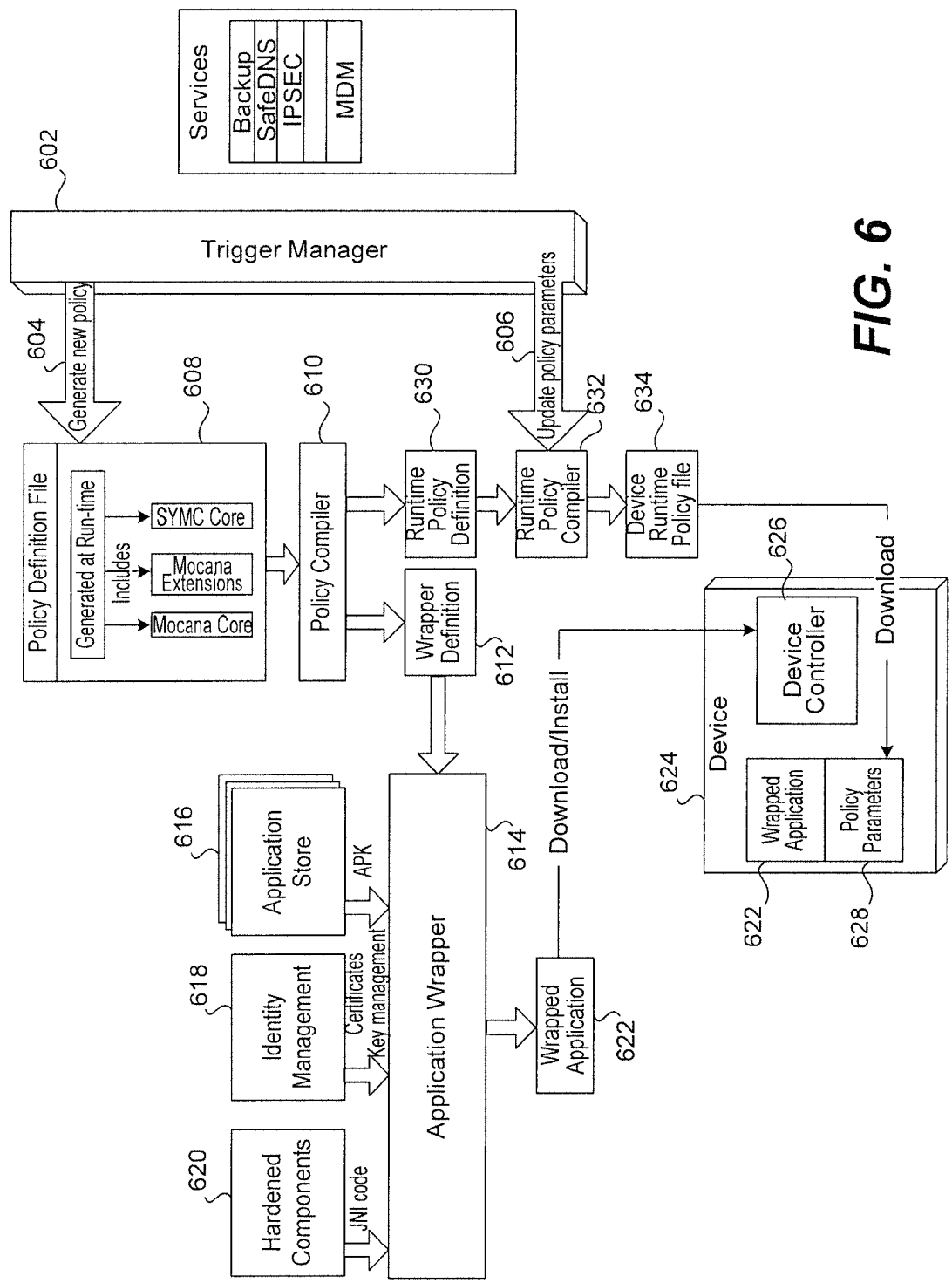
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "App-Control" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device. Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In another aspect of device security and app execution, a user downloads an unsecured app and has it execute with a policy enforced by an engine pre-deployed on the device. In this manner the app is essentially secured on the device (using a policy on the device) after which the security-enforced app can execute. In this aspect of device security and app execution, a third-party app security provider may integrate or pre-deploy its services with existing services (e.g., firmware) offered by the device manufacturer. As such, this embodiment may be referred to as a pre-deployment embodiment. That is, the provider and the device manufacturer work together so that the device (made by the manufacturer) contains software and/or firmware that interacts or communicates with the device operating system and is integrated in the device. In this embodiment, the device manufacturer can inform (e.g., advertise to) potential customers that its device, such as a smart phone, is more secure with respect to app execution than a competitor's device. The customer still downloads apps in a familiar or conventional manner, where the apps are likely to be unsecured (i.e., unwrapped), and when the app executes on the device, it is essentially secured and is significantly less likely to cause damage to the device.

In reference to components and modules from the embodiments described above (i.e., post-deployment embodiments), this aspect of the invention utilizes what may be described as the equivalent of policy manager 202. That is, the functions of policy manager 202 are implemented in the pre-deployment embodiment using other modules and techniques. In one embodiment, policy wrapper 208 described above may not be needed on the device because the security enforcement is done via interpreting or compiling a policy by an enforcement layer. In some devices, such as mobile devices, there is often a Type 2 hypervisor or app "sandbox" operating above the operating system software. This conventional hypervisor or sandbox either allows an app to execute or does not; it provides a somewhat limited binary functionality with respect to app security. In certain aspects of the present invention, described below, another type of hypervisor operates on top of the conventional Type 2 hypervisor, where logic enabling more than mere 'allow or do-not-allow' type functionality is performed.

Normally apps operate by interacting within a sandbox layer above the operating system of the device. This is to ensure that the apps do not interfere with each other during execution. In iOS, the apps utilize shared object files and execution goes through an SWI instruction. The sandbox is part of the iOS operating system.

Figure 7:
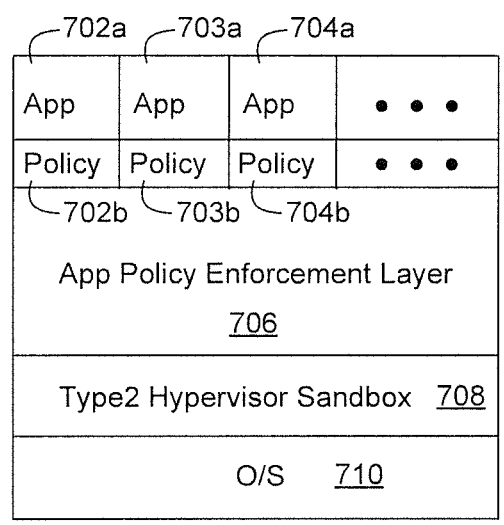
FIG. 7 is a block diagram of components for securing an app on a device during execution in accordance with one embodiment.

As is known in the art, one or more apps may execute in the sandbox (or similar virtual environment) on the device at any given time. In one embodiment of the present invention, an app policy enforcement layer or engine is implemented between the apps and the sandbox. FIG. 7 is a block diagram showing a structure for apps security on a device in accordance with one embodiment of the present invention. This structure has modules and components that reside on the device, e.g., a smart phone, tablet, or TV. Shown are several apps, where each box 702*a*, 704*a*, 706*a* . . . represents the software for each app residing on the device's internal memory (not shown). Attached to each app is a policy 702*b*, 704*b*, 706*b* . . . . As noted above, some apps may not have a policy. However, in most cases, policy manager 202 has performed its functions, that is, creating and managing policies for the user's apps. Since the policies are on the device (or they are downloaded onto the device with the app), the policy manager's functions are done. The policies for each app, or generic policies for the user, are already on the device. However, as described below, there is a process to ensure that the app has an associated policy before it is allowed to execute or perform system calls. App policy enforcement layer 706 contains logic to determine what should be done each time a system call is made by an app. When an app is downloaded onto the device by the user, the app does not have to be previously wrapped or secured; it may be unwrapped, as a vast majority currently are. It is also possible that a secured or wrapped app may be downloaded and the same concepts and methods described below can apply.

As noted, app policy enforcement layer 706 is a software engine that resides on the device, but may be supplied and created by an app control service provider and integrated onto the device by the device manufacturer. The logic performed by layer 706 is described in FIG. 8. Operating under layer 706 is a conventional Type 2 sandbox 708 and the operating system software 710.

Enforcement layer 706 determines how an app should behave when it executes. It examines the policies to determine what actions should be taken when it executes. Enforcement layer 706 may not have any knowledge of how an app should behave with respect to security of the device. That is, layer 706 does not know what the app is allowed or permitted to do on the device. In one embodiment, the only way it can know is by examining the policy associated with the app. In one embodiment, layer 706 interprets the policy, comprised of computer code, when the app makes a system call or request. Upon this interpretation, layer 706 determines how the app may execute or behave on the device. In one embodiment, after the policy has been interpreted by layer or engine 706, one of four actions can be taken. These four actions are the same as those described above. They are shown again in FIG. 8 in the context of security wrapping an app on the device (pre-deployment embodiment).

Figure 8:
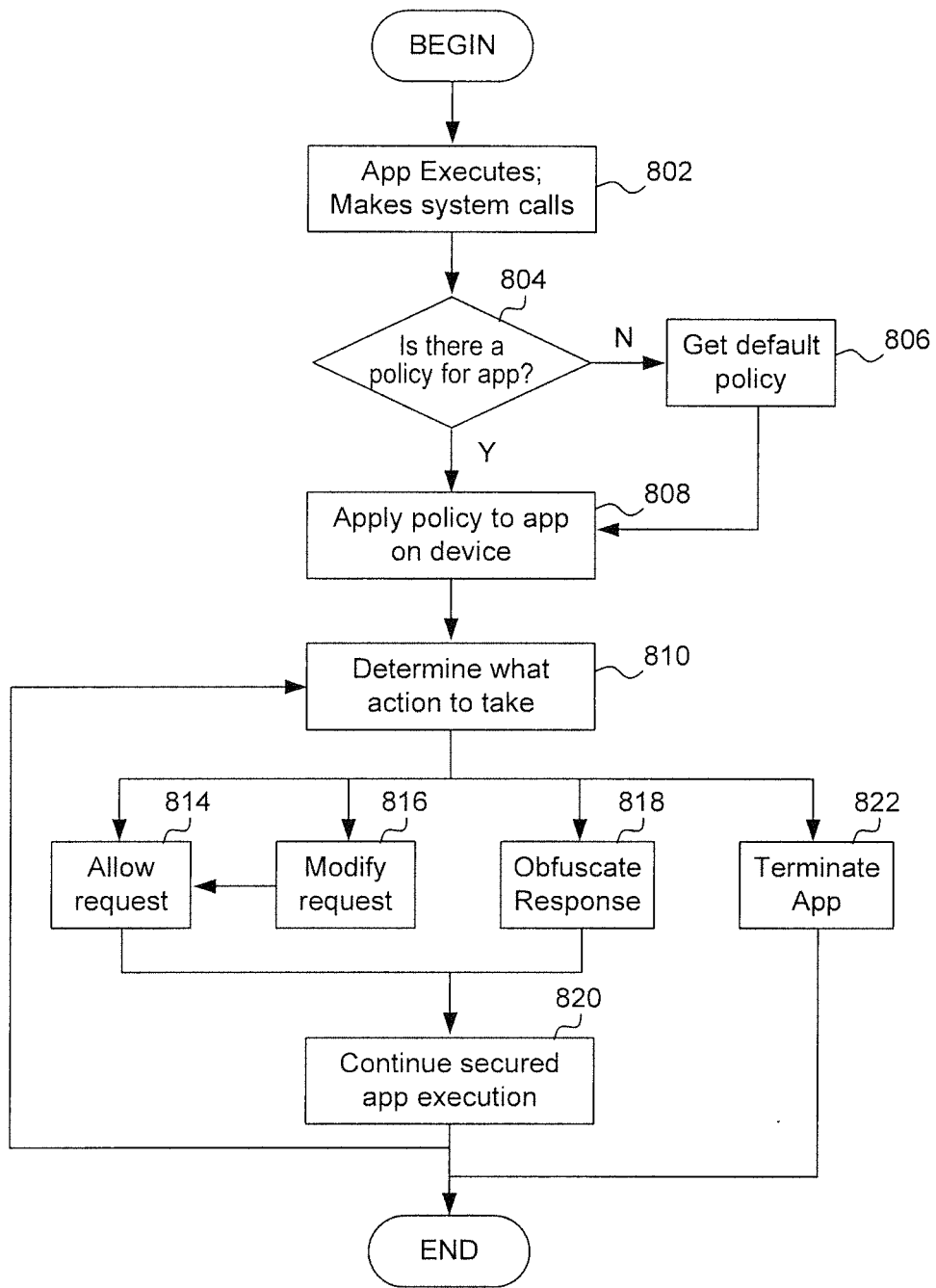
FIG. 8 is a flow diagram of a process of securing an app on a device during execution of the app using integrated functionality of the device in accordance with one embodiment.

FIG. 8 is a flow diagram of a process of applying a security policy to an app before execution on a device in accordance with one embodiment. At step 802 an app that is already executing makes a system call to the device operating system. In one embodiment, the steps of applying the policy and determining what security actions to take occur only after the app makes an actual call to the device operating system. At step 804 enforcement layer 706 checks whether there is a policy for the app that is executing. This may be done with assistance from the policy manager. An example of a policy is provided below. If there is no policy for the app, a default policy for the app or user is obtained from device memory. A default policy is set by the user or the device manufacturer.

If there is a policy, control goes to step 808 where the policy is applied to the app on the device. In the described embodiment, the policy is interpreted by engine 706. Once applied, enforcement engine 706 knows how the app can behave, that is, it knows what it can allow the app to do. In another embodiment, enforcement layer 706 may compile the policy instead of interpreting it. For example, it may perform a 'just-in-time' compile operation, generating code on the spot, for the app where the code is unique for the app. As is known in the art, JIT compiling is generally more efficient than interpreting, and typically can be done only if allowed by the operating system. Typically, dynamic loading of code is allowed only to privileged operating system components. In another embodiment, sandbox 710 (Type 2 hypervisor) can also be protected by collapsing sandbox 708 into operating system 710.

After step 808, enforcement layer 706 applies its logic and determines what action to take with respect to app behavior or what action the app can take at step 810. The call may be no threat to the device and may be allowed to simply pass to the operating system as shown in step 814. From there control goes to step 820 where the app continues execution using app policy enforcement layer 706. If enforcement layer 706 detects that the app is making a request that may pose a security threat to the device, enforcement layer may enhance or modify the actual request before it is passed to the operating system or other software or hardware component in the phone as shown in step 816. After the request is modified, it is allowed to pass to the operating system and control goes to step 814 (and then to step 820). The enforcement layer 706 may determine that the call by the app is an actual threat and should be dealt with in a more severe manner than at step 816. For example, the request may not be allowed to be sent to the operating system or any other component of the device. However, in one embodiment, even though the request may be blocked, a response is still returned to the app, but that response is intentionally not accurate or correct as shown in step 818. It is an obfuscated or deliberately misleading response. If enforcement layer 706 has determined that the call being made by the app, or that the app execution behavior in general, poses too high a security risk to the device, the app is terminated or deleted at step 822 by enforcement layer 706. The process ends after step 822 (i.e., control does not go to step 820). Control then goes to step 820. From step 820 control goes back to step 810 where enforcement layer 706 determines what action to take.

This embodiment may be referred to as a container approach, in that a container wraps around the app. Here the container is part of sandbox 708. In other systems presently in use, there is essentially a big container and all apps must be written and must execute in the single container (e.g., Good Tech). In order to execute out of the container, the app must leave the container. In the described embodiment of the present invention, two different apps, one secured and the other unsecured, can run in enforcement layer 706 at the same time.

As noted, when an app is downloaded, one or more policies may be downloaded with the app. A call or request is made to a policy manager to look up policy data needed for that particular app. In the described embodiment, the app is not modified.

As is evident in the various embodiments, a pre-deployment scenario and the other embodiments, app policies are a key element in ensuring the security of the device. An example of a policy may be that if two apps are from the same author and, therefore, have the same private key, and both apps attempt to execute at the same time, certain actions may be taken, such as preventing the two apps from communicating with each other or sharing information. One app may be a contact manager and the other may be an SMS texting app. Because they have the same signature, the two apps can essentially "see" each other and collude. It is possible that two or more apps from the same author that are executing at the same time can share data and cause harm to the device, even though each app may be benign if executed separately. The policy may prevent apps signed with the same private key from exchanging data in sandbox 708, which operates below enforcement layer 706. In this respect, the described embodiment of the present invention is improving operations of sandbox 708. For example, the present invention may eliminate or reduce the need for binary operations, such as blacklisting and whitelisting of apps, and the like.

It is worth noting that the service provider or the entity providing security for the apps performs all the functions described above, that is, it does all the steps necessary for securing the app on the mobile device from beginning (receiving an original, unwrapped app) to end (producing a security-wrapped app on the mobile device) for each and every app. For example, the service provider receives the original app, strips it, parses it, re-compiles it, and re-signs it and then puts it back in app storage. During the processing, the security provider, for example, locates the relevant or correct classes and substitutes different classes. It essentially performs this same substitution or injection of classes for all copies of the same apps, regardless of the specific needs of the user. Given the volume of apps being developed and downloaded (measuring in the millions or billions over a period of years), performing this class substitution for each copy of the same app would take a significant amount of processing and power. It would be desirable to facilitate the process of security wrapping the app and make the process more efficient. One way to do this is to determine what can be done for all app and what needs to be done to the apps for specific users.

A significant amount of processing can be done before an app is personalized for a particular user. For example, with reference to FIG. 3, steps 312 and 314 can be performed after the app has been personalized, customized or obfuscated (as described below), and this modification can be done to an app template to which an active user policy may be applied or merged, or other functions can be performed, such as randomization.

Figure 9:
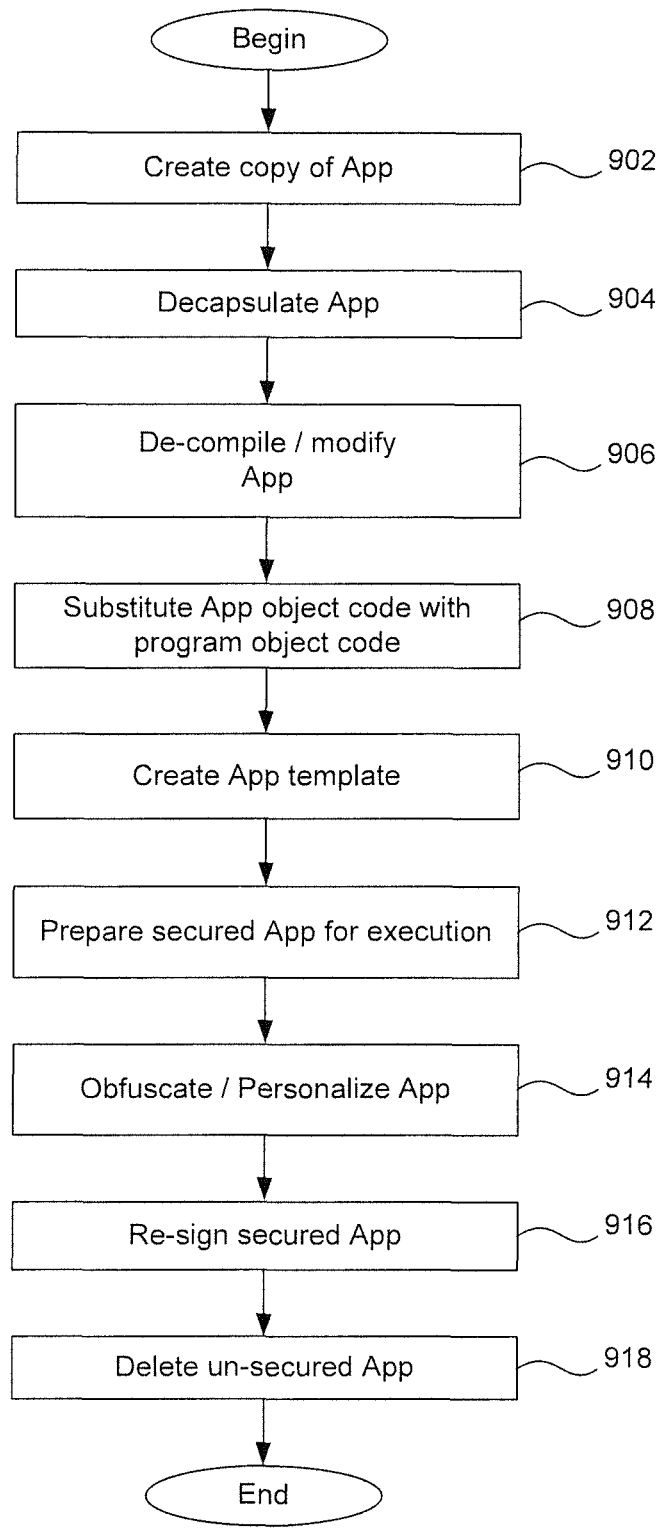
FIG. 9 is a flow diagram of a process of making an app secure before downloading it using a template, followed by personalizing the app, in accordance with one embodiment of the present invention.

FIG. 9 is a flow diagram of a process similar to the process described in FIG. 3. Steps 902 to 908 are, in one embodiment, the same as steps 302 to 308, but are repeated here for completeness. It is a flow diagram showing a process of making an app secure before downloading it using a template, followed by personalizing the app, in accordance with one embodiment of the present invention.

At step 902 a copy or clone of the app that is to be secured is made on the device. By making a copy, the original app is preserved giving the user an option to use either the secured or unsecured version and also protects the user's ability to use the app if something goes wrong with the app control process.

At step 904 the app is decapsulated. Most, if not all, apps have digital signatures signed by the author/developer. At step 904, as part of the decapsulation, the digital signature is removed from the app. This may be done using techniques known in the art. These and other steps provide the core object code of the app which may now be operated on by the app control program. At step 906, the core object code app may be either disassembled or decompiled to obtain the executable object code. For example, it can be either "native code" (CPU instructions) or bytecode (virtual machine instructions, such as Java or .Net).

At step 908 the app object code is augmented with object code from the app security program. For example, this object code may include class files which are replaced with class files from the security program. The object code generally provides an interface to the mobile device operating system. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 910 an app template is created. An app template may be described as a version of the app code that contains, for example, markers or placeholders, that are used to customize the app based on an active user policy or may be used to obfuscate the app code. An app need only have one app template (it may be referred to as "templatizing the app"). With some (possibly most) apps, an app template is nearly complete. That is, it will typically be missing only a few items needed to be a fully functioning, security-wrapped app. This template is then modified based on the user's or a group's specific policy requirements. By customizing an app template, much of the processing needed for security wrapping an app may only be done once. For example, steps 902 to 910 may only be done one time by the app security provider. The markers are used to locate places in the app code where, for example, substitutions can be made to customize the app.

At step 912, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer.

At step 914 the app is personalized or obfuscated by turning markers ON, assuming that the markers are OFF when the template for the app is created. In one embodiment, content in an active policy for a user is merged into the template. If a user policy indicates a certain requirement and there is a relevant marker for that requirement, the marker may be turned ON or made active. If the policy is not active, then the marker is unaffected. For example, a GPS marker may be enabled or made active if a user's policy indicates so, otherwise it is left OFF. Other features may not have a marker, such as a copy/paste requirement which may be required in all apps.

In other embodiments, markers or placeholders may be used to make an app random. For example, special data may be stored in different places in an app for different users so that that special data is not always expected to be in one location. In another example, they may be used to generate code in different patterns for different users. In this manner, if one customized app is hacked or infected, the hacker cannot necessarily do the same to other apps. It enables another layer of security in the security-wrapping process. In many cases, the obfuscation or personalization process may only consume insignificant processing time given that the app template is almost complete and turning markers ON or doing any other functions to obfuscate the code at this stage will likely take little processing time. As such, much of the processing for security wrapping an app is done once to create the app template and the remaining steps are done for individual users or groups of users.

At step 916 the app is signed with a new key, for example, with the key of the service provider or the key of the enterprise providing the secured app. The re-factored, secured version of the app is returned to the handset device. In another embodiment, the app is wrapped with the security layer on the phone. At step 918, in one embodiment, the original, unsecured copy of the app is deleted from the handset device. This may be done by the secured version of the app once it is downloaded onto the handset. In other embodiments, this is not done and both versions remain on the mobile device. At this stage the process is complete. In this manner, a blueprint of an app is made through the creation of an app template, but this blueprint is a flexible blueprint and may be modified in small but important ways that allows for customizing the app for a particular user and, thus, creating different apps for different users, where each app is security wrapped as described above.

In another aspect of the present invention, security wrapping an app enables another capability or feature: data integrity by preventing break point insertions. Various embodiments allow fine grain control of access to information. This capability enables an app to be segmented automatically during the app wrapping process. The result is segmenting an app into multiple logical components, including "trusted execution modules" within the app. A wrapped app is bundled or packaged in a manner to include multiple logical modules and components some of which are trusted execution modules, also referred to as trusted applets. These modules/components may be loaded into different parts of the mobile device when the app is first executed.

Figure 10:
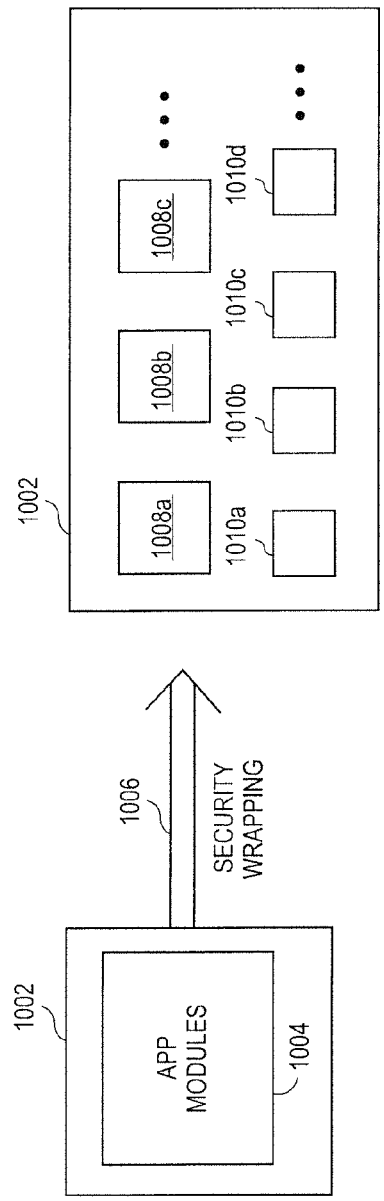
FIG. 10 is a block diagram showing an overview of the process of segmenting an app through security wrapping in accordance with one embodiment.

FIG. 10 is a block diagram showing an overview of the process of segmenting an app through security wrapping in accordance with one embodiment. An app 1002 is made up of multiple app software modules, shown as essentially a monolithic block 1004. These modules and components may be of various sizes and execute various functions within the app. App 1002 goes through the security wrapping process described above and shown in FIG. 10 by arrow 1006. Security wrapping 1006 causes app 1002 to be segmented into a plurality of modules/components 1008a, 1008b, 1008c . . . and trusted modules or applets 1010a, 1010b, 1010c . . . . Modules/components 1008a-c . . . execute in the operating system of the mobile device and trusted applets 1010a-d . . . execute in a trusted execution environment. This configuration is described in greater detail below.

As described above, there are generally two modes of security wrapping an app. One may be described as "preloaded," where the app security engine is pre-loaded on to the mobile device by the device manufacturer. In this mode, any app that is downloaded onto the device is automatically wrapped at download time and is done transparent to the user. In another mode, referred to as "after-market," the mobile device user or another party decides to wrap an app once it has been downloaded. The actual security wrapping is done by a third-party service or by the app provider, but not by an engine on the device itself as in the case of the "pre-loaded" scenario.

Various embodiments of the multiple, logical component bundling for creating an app and data integrity implementation described herein may be applied to both "pre-loaded" and "after market" modes.

With the present invention, even if a device is rooted (e.g., infected with malware) and the operating environment is hostile, embodiments of the present invention are still able to protect the app and data on the device.

One feature of mobile devices is that there is typically an operating environment on the device that is more secure than the primary or general environment where most of the device operations take place. This more secure environment may be referred to as a trusted execution environment or TEE. Modules that execute in the TEE are protected from being scrutinized and data stored there cannot be examined or tampered by external entities. TEE memory cannot be looked at by any external processes or processes running in the operating system. Generally, code that runs in TEE cannot have break points inserted. As such, it would be desirable to protect app code by having at least certain modules or code of the app execute in TEE so that the app remains secure and so its execution does not harm or cause further damage to the device. A hacker should not be able to insert break points into app code and, thereby, obtain sensitive information such as passwords, login data, and the like.

Figure 11:
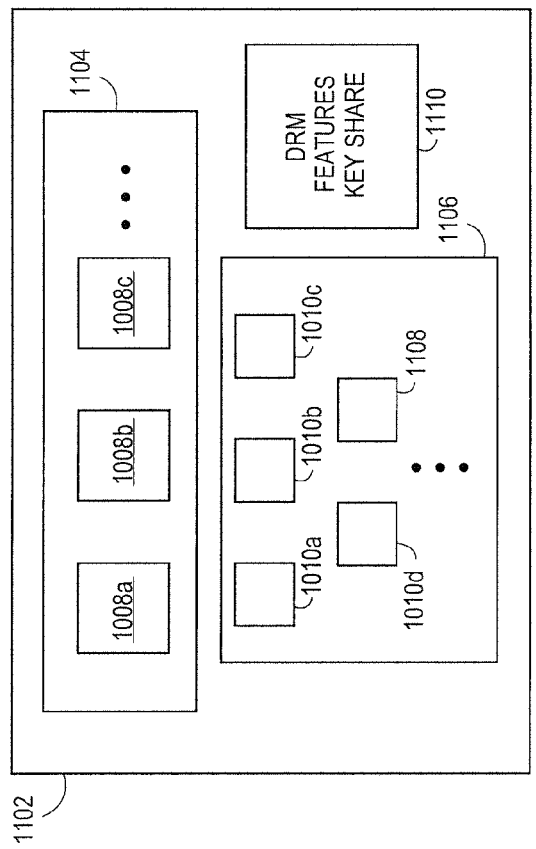
FIG. 11 is a block diagram of a mobile device and various logical components and execution areas within the device in accordance with one embodiment.

FIG. 11 is a block diagram of a mobile device and various logical components and execution areas within the device in accordance with one embodiment. A device 1102 has an operating system environment 1104 and a TEE 1106. Environment 1104 may be characterized generally as the normal or conventional operating environment for the device. It is the area controlled primarily by the operating system (in many cases, a "rich" operating system as currently commonly run on smart phones and tablets). Operating system environment 1104 provides an execution space for modules/components 1008a-c . . . . As described above, these are the regular modules of app 1002. TEE 1106 is a trusted and secure execution space where trusted applets 1010a-d . . . are able to execute and where secret or confidential data, shown as block 1108, may be stored without external processes being able to observe or examine the data. By having trusted applets 1010a-d . . . execute in TEE 1106, hackers cannot insert break points into app 1002.

It is possible for an app developer to take steps to ensure that a hacker cannot insert break points into the app code. However, this is difficult to do if the hacker has the patience and resources to study and closely examine app execution on a mobile device. In addition, many app developers may not have the expertise or time to incorporate this level of security provision, thereby making it difficult for determined hackers from inserting break points. As noted, methods of the present invention can ensure that these security provisions are in place and bundle the app code in a correct and automated manner.

Uses and implementations of the present invention are best shown through an example. A video game app may have a module within the app code for the game that protects, for example, a player's high score. This module may be treated as a trusted applet that executes in the TEE and the high score may be stored in TEE memory. Building this customized, trusted applet, which requires coordination among different components of the app, is typically a complex task. Methods of the present invention address creating the trusted applet for the high score and loading it into the TEE. The trusted applet is likely one among several others that are bundled together with regular modules of the app code. These bundled regular modules and trusted applets collectively comprise the video game app.

Methods of the present invention address building the trusted applet for execution in TEE correctly. Other portions of the app run in the o/S environment, often in a rich O/S environment. In this respect, the resulting app may be referred to as a hybrid "TEE-Rich O/S" app. As noted, the security wrapped app is automatically generated on the mobile device.

In one embodiment, the automatic app wrapping process includes inserting Digital Rights Management (DRM) features into the app. Referring again to FIG. 11, DRM features and a key share are shown in block 1110. Presently, when an app developer wants to incorporate DRM into an app, the app is typically developed from the "ground up" to have DRM features. DRM features are generally not added to an app after initial development; it is often difficult to essentially retro-fit an app or any code with DRM features. Experience has shown that apps that have strong DRM features often provide poor, or less than desirable, user experiences. On the other hand, apps that have positive or strong user experiences are, in part, that way because they are unencumbered by DRM features.

Embodiments of the present invention of logical component bundling for creating an app also enable insertion of DRM features into an app. Thus, an app that has a good user experience can have certain DRM features added. In one embodiment, the process uses split-key share.

A data lease feature may also be used to cause a key share to expire after a certain amount of time (essentially a temporary lease of the key share). It is generally not desirable to allow a key store to persist over a long period of time, as it is more likely that over time it will be compromised from a longer exposure to hackers. This DRM split key runs and is stored in the TEE. As such, it cannot be copied out or observed by external processes. This also prevents "group force" of the key share. By storing the key share in TEE, it cannot be cloned nor can the device be reversed engineered to get access to the data.

In one embodiment, user access and other DRM-related information are added to the header or to the beginning of each file or document in the app. This is done in a manner that is transparent to the app (that is, the app is unaware that its files are being modified). In one embodiment, it is done during the app wrapping process. The data that is added may include identifiers of individuals or groups who have one or more degrees or types of access to the file or document.

In one embodiment, the information added to the file or document may be in the following pseudo-format: a user/set of users+a device/set of devices+app identifier. There can be various levels of DRM constraints within each of these variables. For example, the data may allow an Employee A to use one device, Device A, to access, for example, three company Apps and a PDF reader. Or, a group of five specific employees can use any one of three devices to access all the company's apps. In another example, an employee assigned or designated to be in a particular group (e.g., a division of a company) may use any mobile device in the company to access a specific set of apps (e.g., apps that are needed only by employees in that division or group). In this scenario, a specialized suite of apps can be used by any employee in a particular division, for example, and can use any mobile device in the company to access any app from that suite of apps. Of course, many different scenarios are possible, some of which may not have any limitations on which devices can be used (i.e., there are only restrictions regarding employees/users and apps) or may not have any limitations on employees/users (e.g., there are only limitations on devices and apps). In this manner, a security administrator at an enterprise can choose which apps, devices, and users can use. This goes beyond the conventional one-to-one pairing between one or more security features and one device normally associated with DRM capabilities.

In one embodiment, these DRM-type features are implemented in a manner that is transparent to the app. That is, the app is essentially unaltered and executes in its normal fashion. However, the app security wrapping process enables or injects these DRM features and the ability to control the level of security of the app.

Another aspect of the present invention is providing processes for a user to unlock or recover a locked security-wrapped app on a mobile device. Apps that are security wrapped are passphrase protected. The embodiments described herein relate to when a user has either forgotten a passphrase for unlocking an app or the app has automatically locked because of too many unsuccessful login attempts (e.g., the user has entered the wrong passphrase more than three times). In this case, the app security keystore on the device becomes locked. As described below, the keystore is encrypted with a recovery key which is only in an encrypted form on the device and cannot be decrypted or otherwise accessed by the user. As such, the user cannot unlock the keystore on the device and therefore is not able to unlock the app. Methods and systems below describe ways to access a locked app, whether on a mobile, nomadic, or stationary device using a recovery mechanism that is highly secure in all communications between the mobile device and the service provider server pursuant to a protocol described below. At the same time the recovery mechanism is easy for the end user to carry out. This combination of high-end security and a desirable user experience that is clean, efficient, and user-friendly, especially when using a keypad on a mobile device, has not been achieved in the mobile app security space.

As described above, the service provider providing the mobile app wrapping and security has a server also referred to as console. The mobile device stores and runs the wrapped app and is generally able to communicate via the Internet with the console or via secure socket connection. The app supplier, for example, the end user's employer or the end user's financial institution, provides the app to the end user (the app may also be supplied directly from the service provider) and also plays a role in the unlock and recovery mechanism of the present invention.

Figure 12:
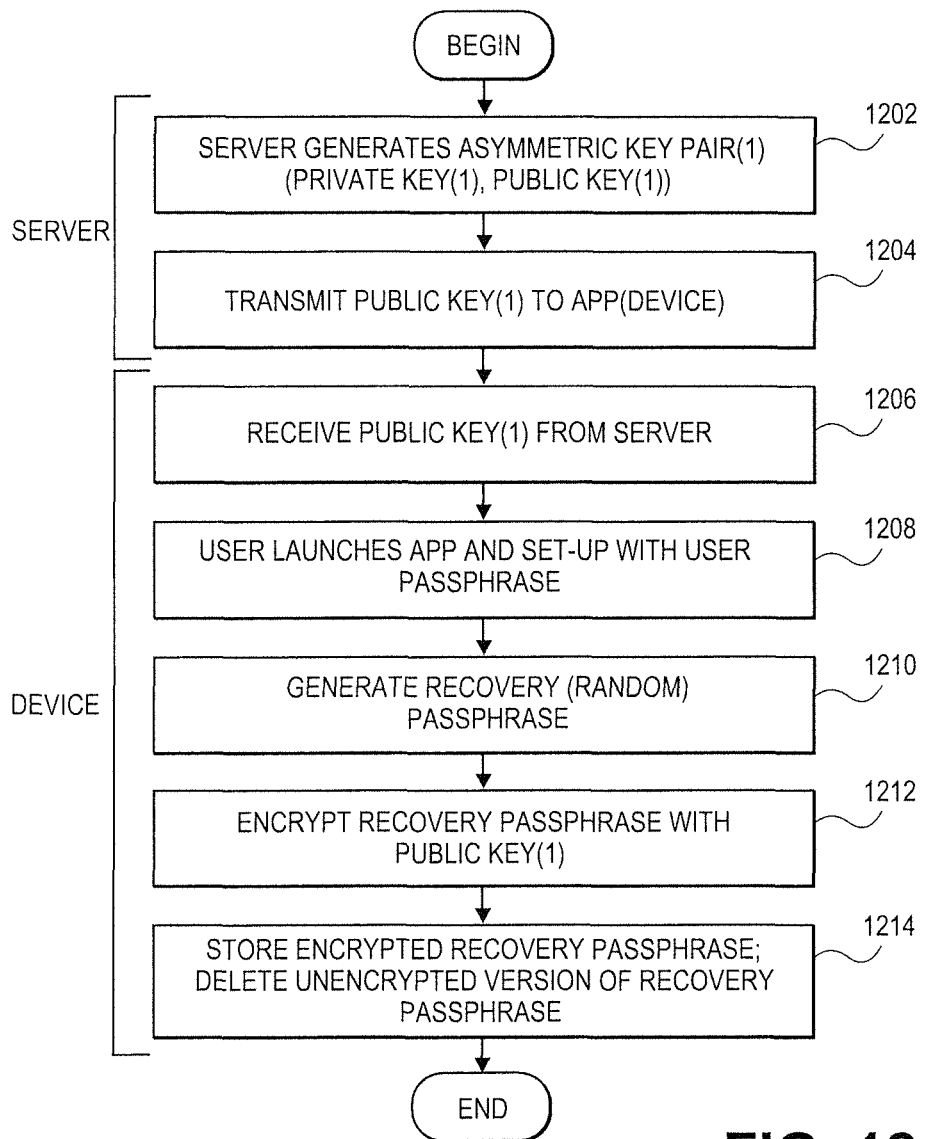
FIG. 12 is a flow diagram showing processes for security wrapping an app and executing the app on a mobile device for the first time that enables secure recovery from a subsequent locked state in accordance with one embodiment.

FIG. 12 is a flow diagram showing processes for security wrapping an app and executing the app on a mobile device for the first time that enables secure recovery from a subsequent locked state in accordance with one embodiment. These are steps that occur during app wrap time on a service provider server, also referred to as a console, and on a user mobile device when the app is first executed. They set up the environment to allow for a secure recovery from app lockout with a desirable user experience. Prior to the first step, an instruction to wrap an app has been received at the server. The app is not yet on the mobile device.

At step 1202, in response to the instruction, the server generates a first asymmetric key pair consisting of a private key and a public key (referred to herein as private key(1) and public key(1)). Public key(1) is packaged with or made part of the wrapped app. At step 1204 the app together with public key(1) is transmitted to the mobile device via an Internet or other network connection or over a secure sockets layer if available.

At step 1206 the device receives the wrapped app and with it public key(1) from the server. At step 1208 the user launches the app for the first time and, in the process, selects a long-term passphrase for accessing the app. The user may see a screen on the device asking the user to set-up the passphrase and other settings when the user first launches the app. Upon completion of setting up the app and passphrase on the device, at step 1210 the mobile device randomly generates a recovery passphrase using conventional components on the device. At step 1212 this recovery passphrase is encrypted using public key(1) sent with the wrapped app from the server. It is useful to note here that the recovery passphrase is now locked and can only be unlocked using private key(1) which is only on the server. At step 1214 the device or, specifically, the app, stores the encrypted recovery passphrase. At step 1216, the unencrypted version of the recovery passphrase is deleted from memory so that it is no longer available. At this stage the app has been wrapped on the server, transmitted to the mobile device, and 'set-up' by the user on the device, specifically a long-term passphrase has been established.

Figure 13:
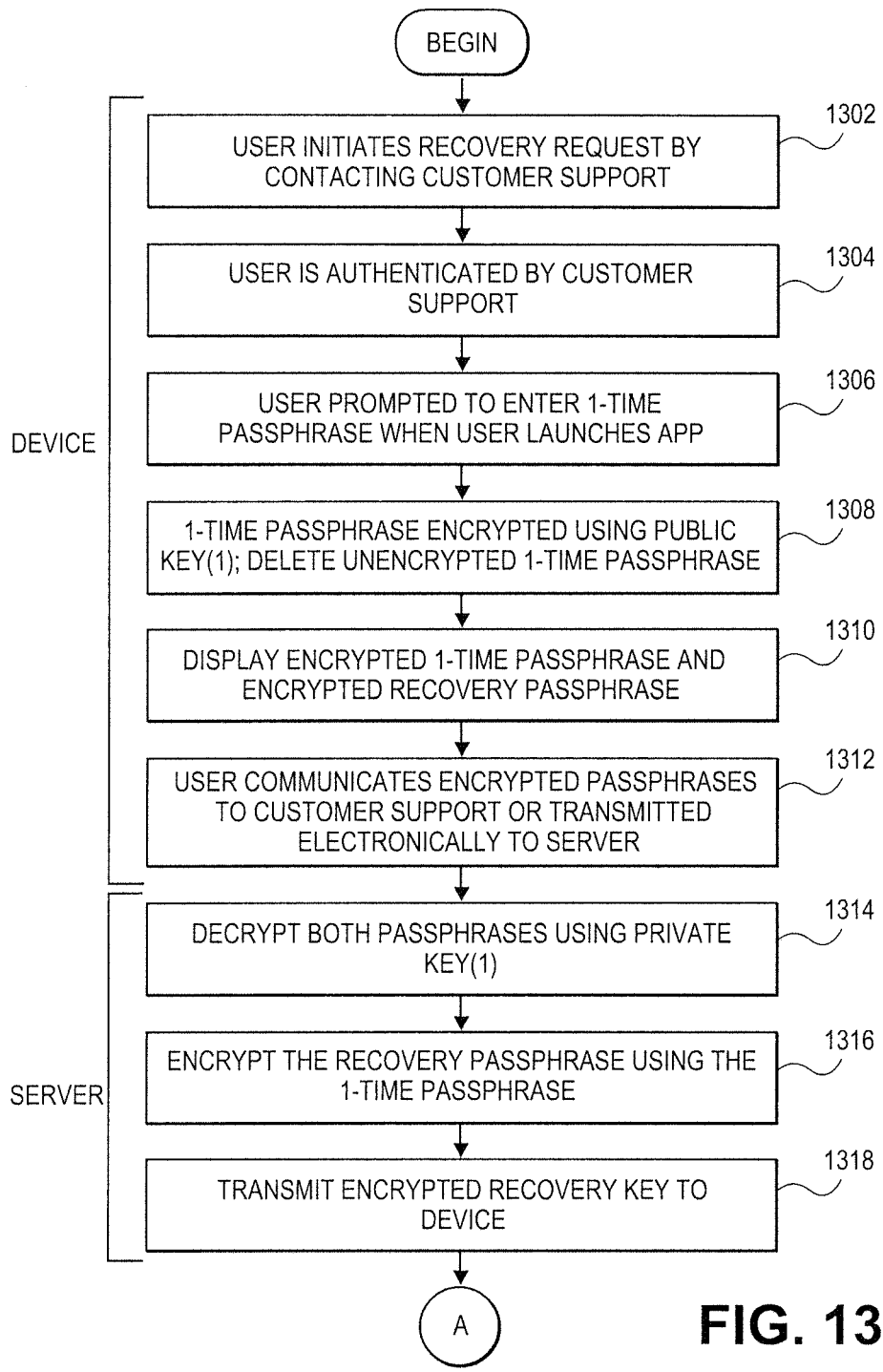
FIG. 13 is a flow diagram showing processes of unlocking and recovering from a locked app in accordance with one embodiment.
Figure 13:
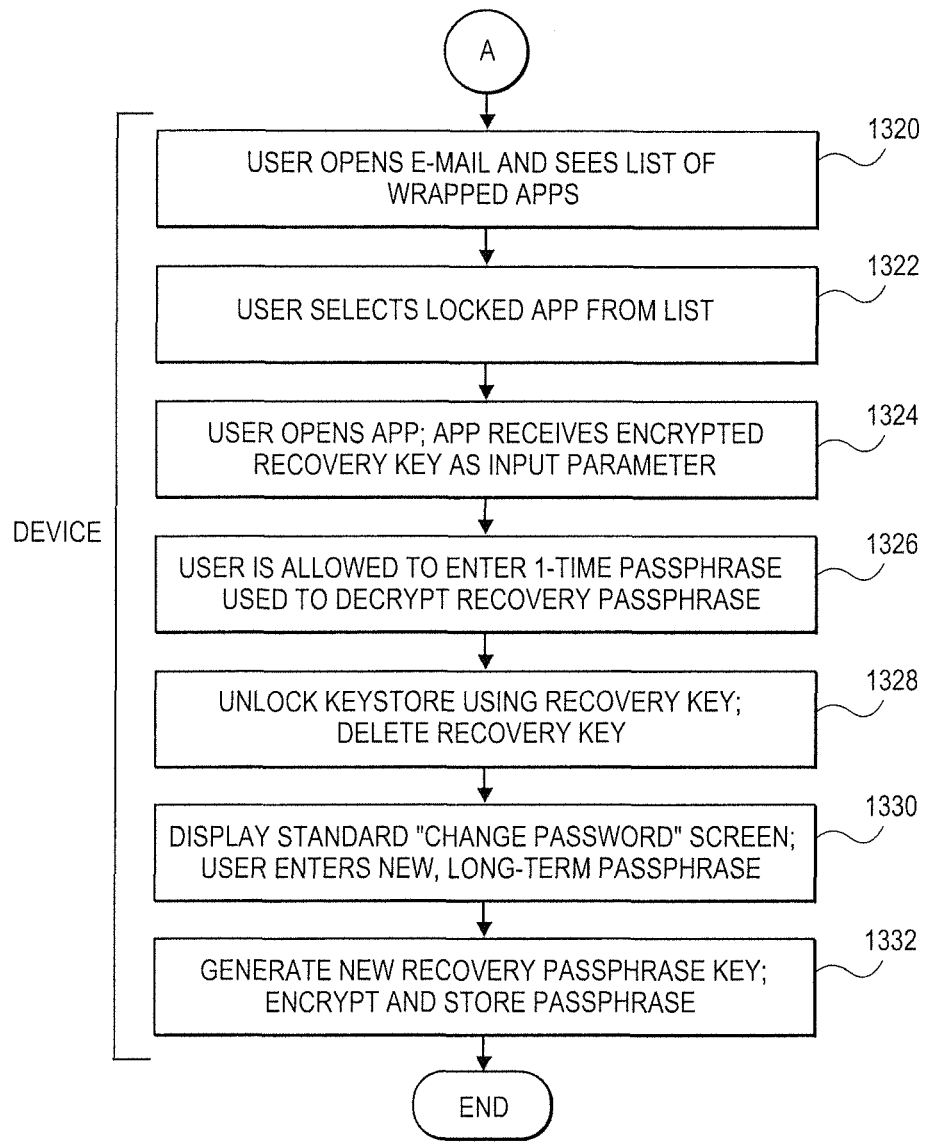

FIG. 13 is a flow diagram showing processes of unlocking and recovering from a locked app in accordance with one embodiment. The user has been locked out of the app (e.g., by forgetting the passphrase, making too many failed attempts to login, etc.) and needs to unlock the app and establish a new long-term passphrase. As noted, the reason the app is locked is because the keystore (for the app security software) is locked with the recovery key and there is no unencrypted key on the device to unlock it. Thus, an unencrypted version of the recovery key is needed to unlock the keystore, thereby recovering from the locked app. As noted above, this is accomplished in the present invention through secure data transmissions and in a manner that is easy and intuitive for the user. Recall from FIG. 12, that the device has in memory the recovery passphrase but it is locked using public key(1).

At step 1302 the user, locked out of the app, begins the recovery process, in one embodiment, by contacting support requesting passphrase reset. Support may at the user's employer, financial institution, or generally any entity that provides the secured app. In one embodiment, the phone number for user support may be put in the app when the app is provisioned for end users. In other embodiments, the user may contact support via other means, such as e-mail or SMS. At step 1304 the user is authenticated by customer support. This may be done in any manner suitable to the app provider. In one embodiment, it is over the telephone so that the end user can answer security questions or verify identity in a conventional manner. The service provider (the entity providing the app wrapping software) is generally not involved in authenticating or verifying the end user.

At step 1306 the end user opens or launches the wrapped app and at the "App is locked" display (or similar display) on the mobile device the user is prompted to enter a new, one-time, long-term passphrase chosen by the user and validated against complexity rules. In allowing the user to select this one-time passphrase, it is more likely it will be remembered by the user. This is in contrast to conventional recovery mechanisms in which the service provider generates a random passphrase which the user is required to remember (e.g., write down, copy and paste, etc.) and enter at a later stage. This process is especially advantageous in the context of a mobile device with a small touch-screen keyboard because entering information on such a device tends to be burdensome and error-prone because of the lack of a full-size keyboard. By allowing a user to select a passphrase, the user can select one that is easier to enter (e.g., less toggling between alphabetic characters and numbers) compared to a randomly generated passphrase. The user enters the one-time passphrase into a text entry box on the screen. At step 1308 the one-time passphrase is encrypted using public key(1). This locked version of the one-time passphrase is stored in device memory and the unencrypted version of the passphrase is deleted from the device so that it can longer be accessed by any entity.

At step 1310 the encrypted one-time passphrase and the encrypted recovery passphrase are displayed on the mobile device so that the user can view then. At step 1312 both locked versions of the passphrases are transmitted to user or customer support over the telephone or electronically (e.g., secure sockets or e-mail). The passphrases are encrypted and transmitted to the app provider in a secure manner. It is useful to note here that the keystore for the app on the device is still locked and cannot yet be opened by the user.

Steps 1302 to 1312 occur on the mobile device or are taken by the mobile device user. At step 1314 execution switches to the server. The server uses private key(1) to decrypt the locked one-time passphrase and the locked recovery passphrase (both of which were encrypted using public key(1)). At step 1316 the now unlocked recovery passphrase is once again encrypted using the now unlocked one-time passphrase that the user entered on the device at step 1306. At step 1318 the encrypted recovery passphrase is transmitted from the service provider console or server as an attachment to an e-mail to the mobile device, more specifically to the app. In another embodiment, other communication mechanisms, such as secure sockets, may be used.

At step 1320 the user opens the e-mail and, in one embodiment, is presented with a list of wrapped apps. In another embodiment, the user is presented with an app having a unique file extension to eliminate any ambiguity so that a list is not required (and the user does not have to select the right app from the list). In another embodiment, the unique file extension embodiment can be used with a list for a group or federation of apps. At step 1322 the user selects the locked app from the list. At step 1324 the user opens the selected app and the app receives the encrypted recovery key as an input parameter. By receiving the key as a parameter, the app knows it is in the process of recovering from lock mode. At step 1326 the user is prompted to enter the one-time passphrase that he selected at step 1306. This passphrase should be easy to recall and enter by the user. This passphrase is used to unlock the recovery passphrase. Recall that at step 1316 the recovery passphrase was encrypted using the one-time passphrase.

At step 1328 the keystore for the app is unlocked using the recovery key on the device. Once the keystore is unlocked, the app can execute in a normal manner. At this stage the recovery key, no longer needed, is deleted from the mobile device.

At step 1330 a standard display asking the user to "Change Password" or something similar is shown and the user selects and enters a new, long-term passphrase which is used going forward to unlock the app. At step 1332, after the user has selected a new, long-term passphrase, a new recovery passphrase is generated randomly on the device. It is encrypted using public key(1) and stored on the device. The same asymmetric key pair(1), described at step 1202, may be used. At this stage the process of unlocking and recovering from a locked, security-wrapped app is complete.

Figure 14:
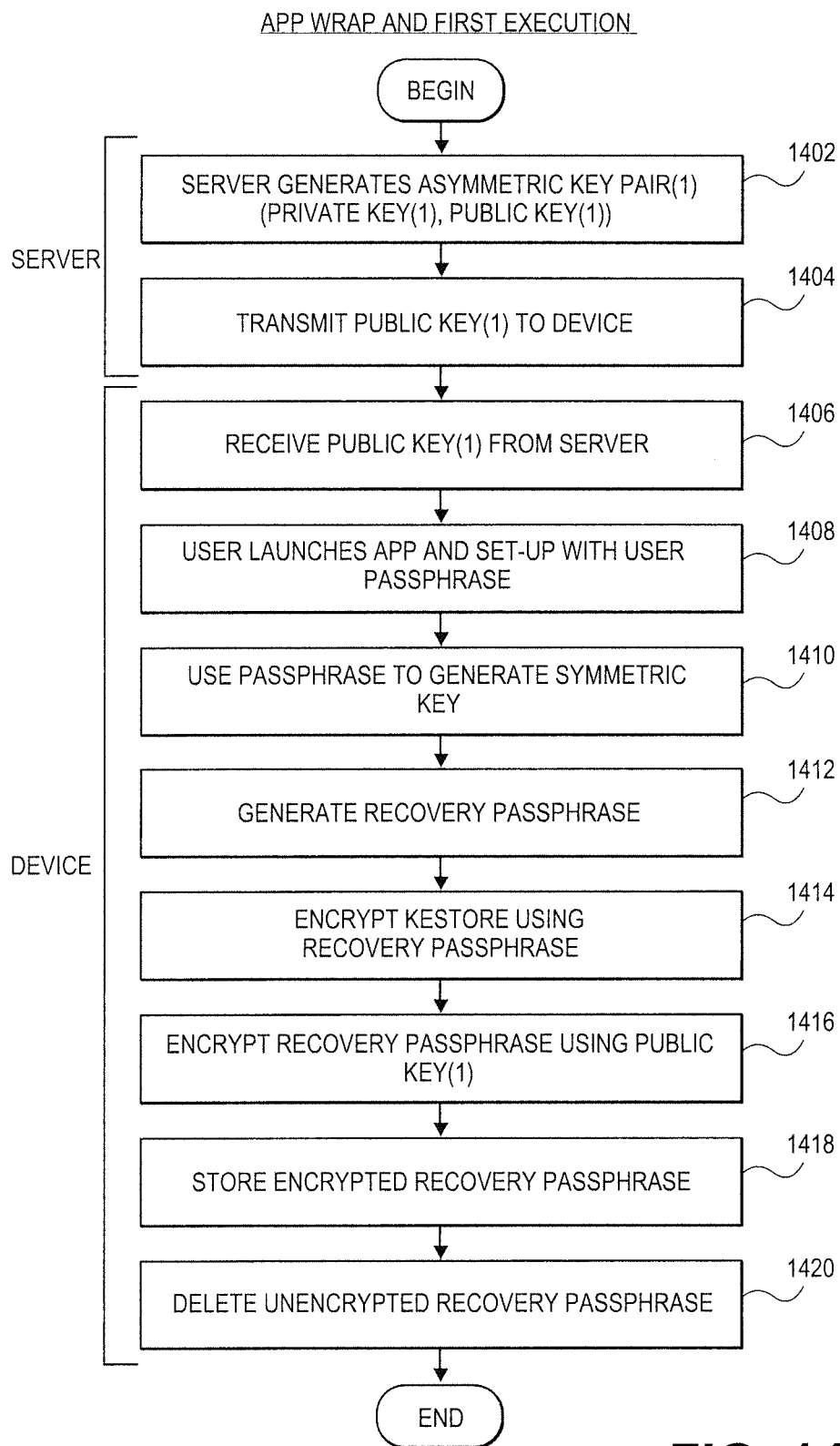
FIG. 14 is a flow diagram showing other processes for security wrapping an app and executing the app on a mobile device for the first time in a way that enables secure recovery from a locked state in accordance with one embodiment.

FIG. 14 is a flow diagram showing other processes for security wrapping an app and executing the app on a mobile device for the first time in a way that enables secure recovery from a locked state in accordance with one embodiment. As with FIG. 12, these are steps that occur during app wrap time on, for example, a service provider server or console, and on a user mobile device when the app is first executed. These steps set up the environment that subsequently enables a secure recovery from app lockout while keeping a desirable user experience. Prior to the first step, an instruction to wrap an app has been received at the server. The app is not yet on the mobile device.

At step 1402 the server generates a first asymmetric key pair, referred to hereafter as key pair(1), comprised of private key(1) and public key(1). This is done when the server wraps the app. At step 1404 the public key(1) is transmitted to the mobile device from the server. It is sent as part of the wrapped app when the server sends the wrapped app to the device. At step 1406 the device receives the wrapped app together with public key(1) from the server. At step 1408 the device user launches the app for the first time and configures the app, including selecting a long-term passphrase for the app.

At step 1410 the passphrase selected by the user is used to derive a symmetric key. The device also generates a random recovery passphrase which, in one embodiment, is not generated from the user-selected passphrase but solely by the device at step 1412. At step 1414 the master symmetric key that protects the app keystore that is on the device is encrypted using a symmetric key derived from the device generated recovery passphrase. The recovery key is then encrypted using public key(1) at step 1416 and is stored on the device at step 1418. The unencrypted version of the recovery key is deleted from device memory at step 1420. At this stage, the wrapped app has been launched for the first time on the device and the steps needed to prepare the device and server for recovering from a lockout in a secure manner with a desirable user experience is now complete.

Figure 15:
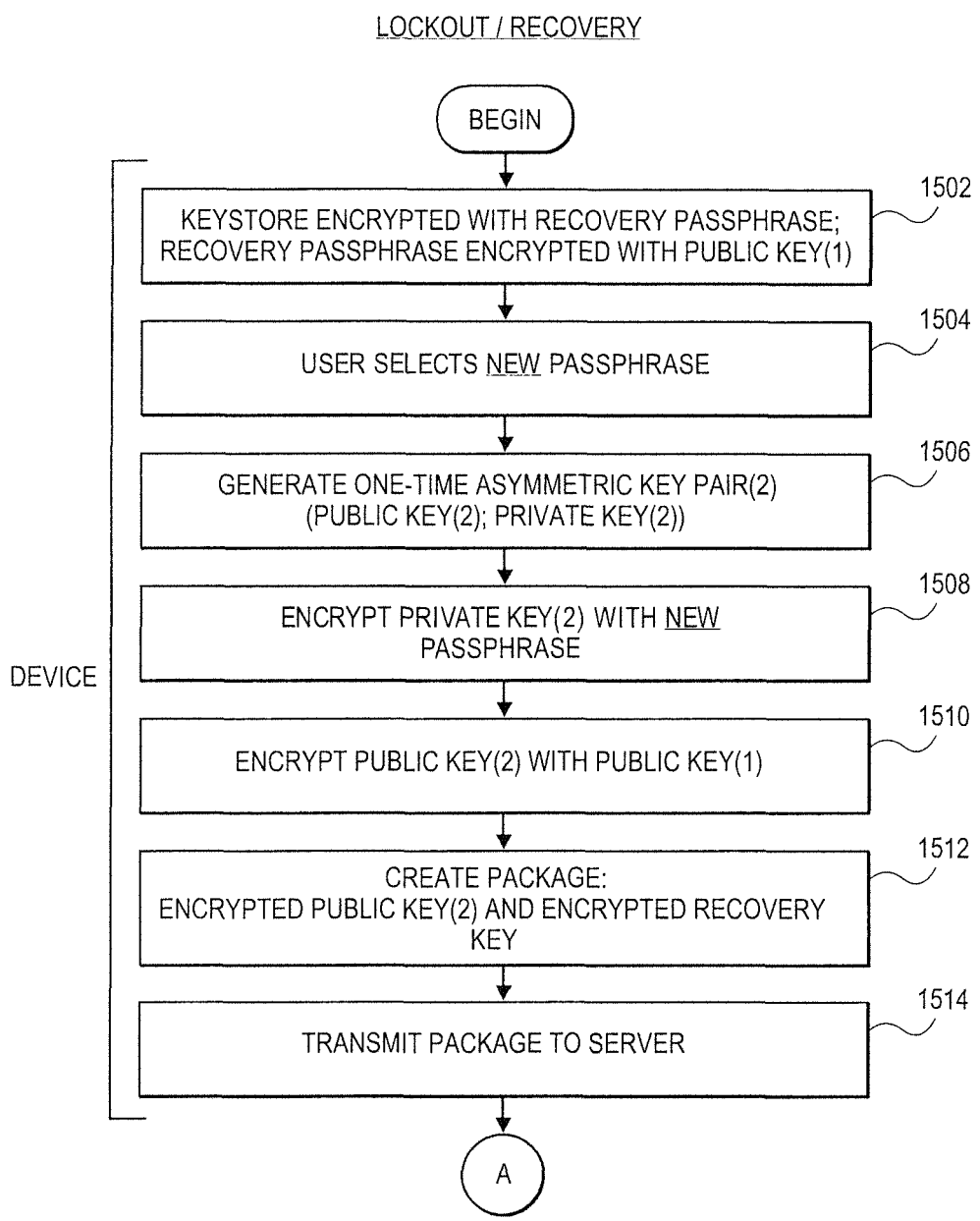
FIG. 15 is a flow diagram showing processes of unlocking or recovering from a locked app in accordance with one embodiment.
Figure 15:
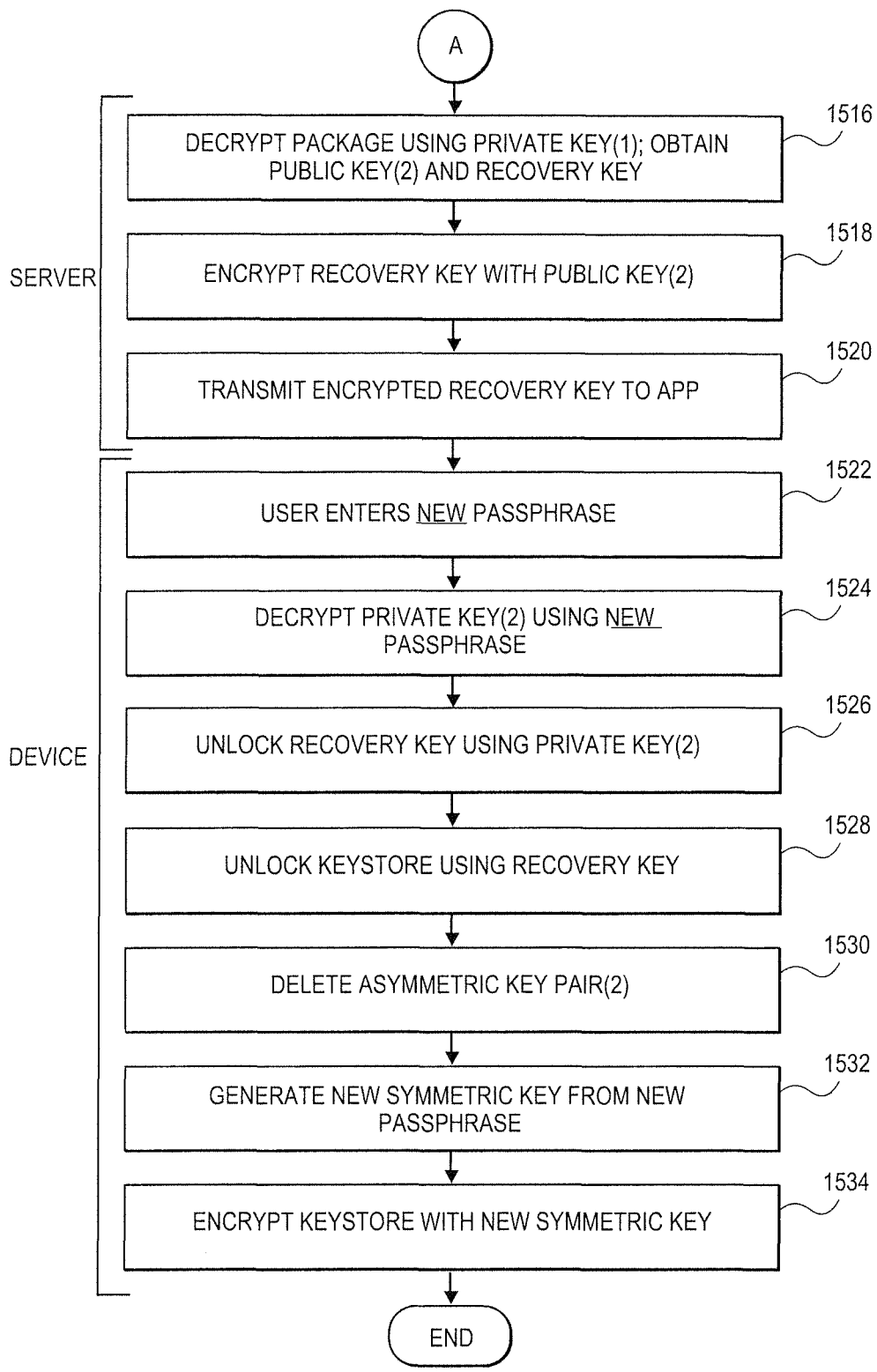

FIG. 15 is a flow diagram showing processes of unlocking or recovering from a locked app in accordance with one embodiment. As noted above with respect to FIG. 13, the user has locked himself out of the app (e.g., forgetting the passphrase, making too many failed attempts to login, etc.) and needs to unlock the app and establish a new long-term passphrase. The reason the app is locked is because the app security keystore on the device is locked and there is no unencrypted key on the device to unlock it. In the described embodiment, the keystore is locked using the recovery key. Therefore, an unencrypted version of the recovery key is needed to unlock the keystore, thereby recovering from the locked app. Only an encrypted version of the recovery key is on the device. As noted above, this is accomplished in the present invention through secure data transmissions (between the server and device) and in a manner that is easy and intuitive for the user. Recall from FIG. 14, that the device presently has in memory the recovery passphrase encrypted using public key(1).

Step 1502 describes the current state on the device. As noted above, the device has an app security keystore that is encrypted or locked using the recovery passphrase. Recall that the recovery passphrase has been encrypted using public key(1). At step 1504 the user selects a new long-term passphrase for accessing the app, a passphrase that is easy for the user to remember. In another embodiment, the user may contact customer support of the service provider (e.g., his employer, financial institution, and the like) to authenticate himself using any suitable means as selected by the service provider. In either embodiment, the user selects a new permanent passphrase which is not communicated to customer or user support.

At step 1506 a one-time asymmetric key pair is generated on the device, referred to herein as public key(2) and private key(2) which stay on the device. At step 1508 private key(2) is encrypted using the new, long-term passphrase selected by the user. At step 1510 public key(2) is encrypted using public key(1) (sent from the server as part of the wrapped app). At step 1512 the device creates what may be described as a data package which includes the encrypted public key(2) and the encrypted recovery key. The device transmits the package to the server at step 1514 via any suitable secure transmission means.

At step 1516 the server decrypts the two individual encrypted items in the package from the device using private key(1). Recall that both public key(2) and the recovery key were encrypted using public key(1) on the device. At step 1518 the recovery key is encrypted using public key(2) (which the server now has because of step 1514). At step 1520 the encrypted recovery key is transmitted back to the device, specifically the app.

On the device, at step 1522 the user enters the same passphrase that was selected by the user back at step 1504. Private key(2) is decrypted on the device using this passphrase at step 1524. Recall that private key(2) was encrypted using this user-selected passphrase at step 1508. At step 1526 the recovery key is decrypted using private key(2). Recall that at step 1518 the recovery key was encrypted using public key(2) on the server. At step 1528 the app security keystore on the device, which is locked causing the user to be locked out of the app, is unlocked using the recovery key. Recall that the recovery key is not kept in any form on the device (at step 1420 of the app wrapping and initial launch process, the recovery key was deleted from the device).

At step 1530 asymmetric key pair(2) is no longer needed and is deleted from the device. Following steps described in FIG. 14 when a new user passphrase is set up (see step 1408), at step 1532 a new symmetric key is derived from the new passphrase entered by the user during the lockout/recovery process. Finally, the keystore master key is re-encrypted with the new symmetric key derived from the new user passphrase and the symmetric key derived from the new device generated random recovery passphrase.

In the described embodiment, the mobile device may be a smartphone, tablet, or other mobile device. In other embodiments, the device may be a PC or a laptop. It may also be a wearable device, such as an Internet-enabled watch, goggles, glasses, rings, wrist and ankle monitors (e.g., health and wellness meters), activity trackers or other nomadic Internet-enabled computing devices. In yet other embodiments, the device may be any Internet-enabled appliance or system. Examples include cars that have Internet access, household appliances (refrigerators, washers, etc.), or HVAC, home heating/AC systems, or security systems. As noted, the described embodiment uses mobile devices where users download apps. However, the present invention may also be used in other embodiments and contexts.

Another aspect of the present invention describes different levels of granularity of propagating policies to a user (e.g., an employee at a company) or to a device such as a device utilized for work and personal use.

The present level of policy propagation is essentially at the app level: all copies of a particular app get the same policy updates. The policies for that app are whatever is hard-coded in the app. As such they are applied to whoever uses the app regardless of device or platform.

The first level of extension may be the ability to update or upgrade policies based on user alone. For example, all apps for a particular user or employee should have the same policies. So, all apps for a user's personal use have the same policies. Or, another level of extension may be a multiple-tenancy per app scenario. Here, an app has a group of users (the "multi-tenancy" aspect) and each user within the group has certain policies (some users may have the same policies) for that app. In another embodiment, each user using that app may get certain policies for a particular device. The deepest level down with the most extensive or granular provisioning covers the scenario most likely anticipated by employers or institutions: for a particular employee using a specific app on a specific device apply this set of policies, wherein the device may be an employer-provided device or an employee's personal device.

As noted, current app-wrap provisioning is done on a per-app basis. The service provider console or server operated by an employer or service provider tracks the initial operation of someone wrapping an app. For example, the Dolphin browser is wrapped and this wrapped version is stored in a database under control of the console. If a user gets a version of the wrapped app but with different policies (policies that were applied through a console) or if the user gets a version of the wrapped app only to be used on an employer-issued device and not on her own personal device, these different versions of the wrapped app are not tracked in the console database. Presently, there is only one app within the console database, even if the app is subsequently wrapped with different policies, whether for a different user or a different device. The console does not track a particular state of the app for a particular user. As noted, it would be desirable to have the console be able to track wrapped apps by user, app, and device. There is only one version stored in the database and it is essentially stateless and does not reflect other versions. This makes it difficult, if not impossible, to use the console to tie down or associate a particular instance of a wrapped app with a particular user, group of users, a device, an employer, and so on.

In one embodiment, finer granularity uses the lockout/recovery protocol described in FIGS. 12-15 (used in a different context to authenticate a user and to obtain a recovery key).

Presently, there is nothing to link a keystore on a device with a wrapped app or to tie a user with an instance of a wrapped app. Methods and systems for tying an app to a particular user are described. As noted, it is possible to tie an app to certain data and policies. Using the lockout/recovery protocol, it is possible to determine who authenticated themselves with an employer and from this, the employer can provision the employee's app with policies assigned to that employee.

Currently, app security wrapping is integrated with app provisioning. In one embodiment of the present invention, when a service provider handles provisioning for a particular employer, this is done on a server different from the server that performs the actual security wrapping of the app. In this manner, the security wrapping of the app is separate from app provisioning.

In one example, an employer has one generic, wrapped app. An employee downloads the generic wrapped app onto her mobile device. However, the wrapped app is not provisioned with policies and, as such, cannot be utilized until provisioning is done. The employee may then contact the IT department. The employee authenticates herself to the employer and asks the IT department to provision the app on her tablet with the policies that she is supposed to have. These policies are retrieved by IT, or the employee may tell IT which policies she should have.

The IT may then securely obtain the actual policies for the employee requesting app provisioning. In this manner, the wrapped app is provisioned on a separate server.

In one embodiment, a generic wrapped app may have all policies offered by an employer but with none of the policies activated. For example, the wrapped app may not have a configuration file instructing which policies are to be "turned on" for that user. As such, when the app starts, one of the first steps taken by the app is ensuring that it has a configuration file that it can trust. That is, the configuration file is one that was securely obtained from the employer. Methods described below show how that policy configuration file can be obtained securely and not tampered with.

Figure 16:
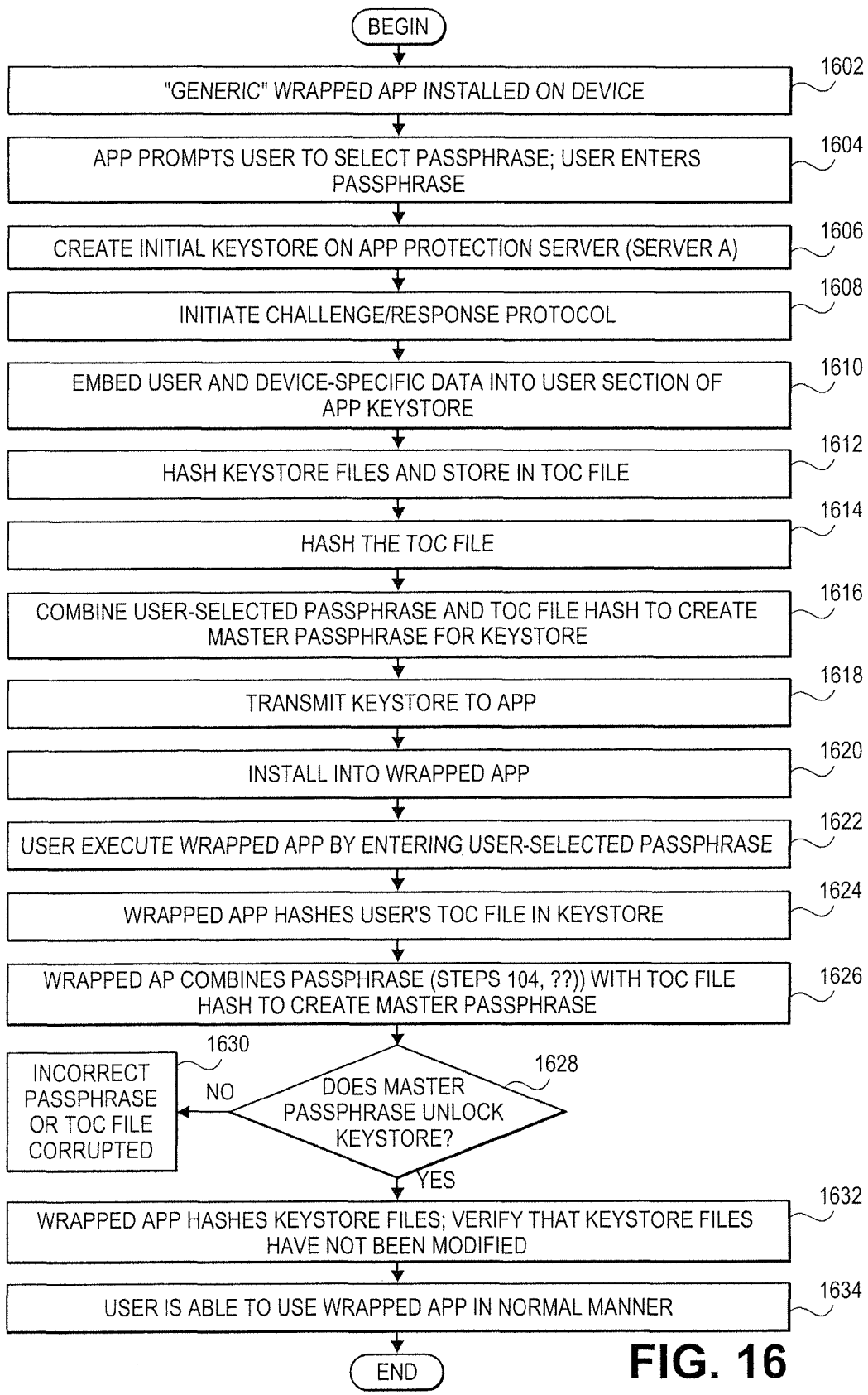
FIG. 16 is a flow diagram of a process for unlocking a keystore and allowing a user to execute an app in accordance with one embodiment of the present invention.

FIG. 16 is a flow diagram of a process for unlocking a keystore and allowing a user to execute an app in accordance with a preferred embodiment of the present invention.

At step 1602 an employee downloads a wrapped version of an app that may be characterized as generic in that at time of downloading and installation on the device, the app is not customized in any manner for a specific device or user.

The first time the wrapped app starts, it recognizes that it has not yet been provisioned for the user (the user does not yet have a user-specific section in the keystore) and prompts the user to select a passphrase.

At step 1604 the app prompts the user to select a passphrase; that is, the user decides what passphrase she wants to use for unlocking the app going forward.

At step 1606 a keystore which has a user section and a table of content (TOC) is created on the app protection server.

Once the user selects and enters the new passphrase, a challenge/response protocol is initiated or triggered. At step 1608 the protocol delivers (from the app protection server) to the device (or, more specifically, the app) part or all of the keystore that is customized for the specific app/user/device.

At step 1610 the user and device-specific (policy) files are embedded into the user section of the app keystore on the app protection server. In one embodiment, some or all of the keystore files (e.g., the policy files) are hashed and the hash values are stored in a TOC file at step 1612.

At step 1614 the TOC file on the app protection server is hashed. The cleartext version of the TOC files remains. In another embodiment, a TOC file is not used. Instead, hash values of the keystore files from step 1612 are used, as described in step 116.

At step 1616 the user-selected passphrase from step 1604 is combined with TOC file hash value from the previous step to create a master passphrase for the initial keystore created on the app protection server at step 1608.

At step 1618 the resulting partial or complete keystore on the server is transmitted to the app on the device. At step 1620 the partial or complete keystore is installed in the wrapped app.

At this stage the first stage of downloading the app, creating the keystore, and installing the keystore in the wrapped app is complete. At this stage, the app resides on the mobile device and is waiting to be executed by the user.

At step 1622 the user executes the wrapped app by entering the user-selected passphrase selected at step 104. At step 124 the wrapped app itself hashes the TOC file in the keystore. The wrapped app combines the passphrase just entered by the user (selected by the user at step 1604) with the hash of the TOC file created at step 1624 to create a master passphrase for unlocking the keystore.

At step 1628 the wrapped app determines whether the master passphrase unlocks the app's keystore. If it does not, the user may have entered the wrong passphrase or the master passphrase is incorrect as indicated at step 1630 which implies that the TOC file has been tampered with or is corrupted. If the master passphrase does unlock the keystore, control goes to step 1632 where the wrapped app hashes the keystore files. The app then verifies that the keystore files have not been modified. It may do this by comparing the hash values with the hash values of the keystore files created at step 1612. If the app can verify that the keystore files have not been modified and that all relevant files have passed tamper detection, control goes to step 1634 where the user is able to use the wrapped app in a normal manner using the passphrase she selected at step 1604.

Figure 17:
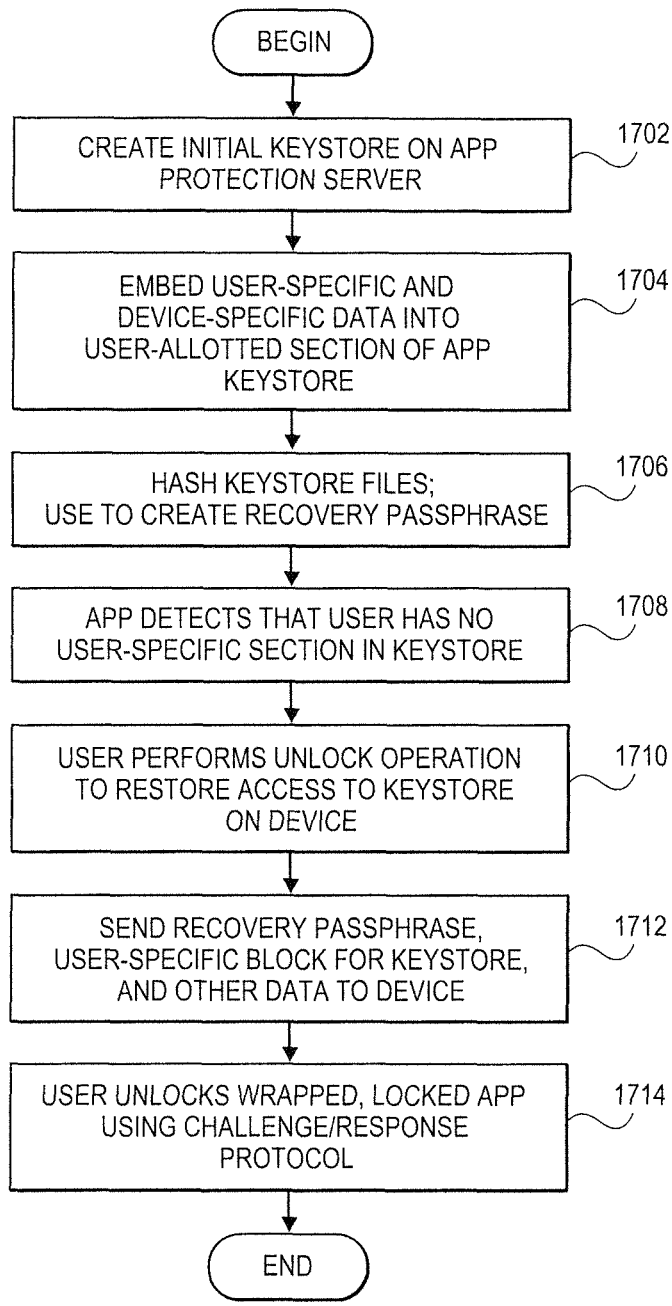
FIG. 17 is an alternative method of separating the operations of wrapping an app on one server and provisioning the app on a different server in accordance with an alternative embodiment.

FIG. 17 is an alternative method of separating the operations of wrapping an app on one server and provisioning the app on a different server in accordance with an alternative embodiment. In this embodiment, at step 1702, a user's initial keystore is created on an app protection server (referred to as "server A") which may not necessarily be the same server that does the actual app security wrapping. However, preferably this server is different from the app provisioning server (referred to as "server B"). A chain of trust is maintained by the app protection service provider, such as an employer, on each passphrase update by the user on the device. At step 1704 server A embeds user-specific and device-specific information into a user section of the wrapped app's keystore. For example, each user may have their own public key, their own policies file, and so on, stored in this user section.

The app protection server (which has the user keystore) has data on all of the files that should be present in the user section of the keystore. At step 1706 the server hashes each of these keystore files and uses one or more of the hash values as one of the inputs for creating the user's initial recovery passphrase.

In one embodiment, a hash value is combined with a random string. At step 1708, the first time a user logs into a wrapped app, the app detects that the user does not yet have a user section in the keystore. In another embodiment, the user selects an initial passphrase and this is sent to the app protection server. This passphrase may be combined with a hash value of files that the user (or employer) wants to protect. The resulting value from this combination is the combination of the user's selected passphrase and a hash value that is generated transparently. In this manner, the passphrase is not merely a randomly generated string.

At step 1710, a challenge/response protocol described herein for recovering a passphrase and unlocking a device is used for an unlock operation to restore access to a keystore on the device. During this process, in one embodiment, a server which may be the app protection server or the provisioning server, or yet a different server, creates a keystore for the user based on the user's privileges as defined, for example, by an employer. At step 1712 the encrypted recovery passphrase is sent to the device or app along with a new user block for the keystore that contains an initial "recovery" passphrase (in one embodiment, the passphrase does not actually recover any data), a second recovery passphrase, DAR ("data at rest") keys, a policy file, and other user-specific files that may be needed. This user keystore section may be pushed to an app dynamically after the wrapped app is installed on the device.

At this stage, at step 1714, the user follows a procedure for unlocking a locked, wrapped app following a challenge/response protocol. The user enters the unlock passphrase that she selected at the beginning of the app wrapping and installation phase (i.e., the app unlock passphrase used by a user to unlock an app). As described above, the user device receives an initial keystore that has been populated with all data and files needed by the user (e.g., keys, recovery passphrase if desired, and the like). The keystore is encrypted with a passphrase that, as noted above, was generated by combining a passphrase selected by the user at the start of the process and the hash values of files that must be protected from tampering. In one embodiment, the wrapped app first hashes the user-specific files (policies, etc.) and uses those hash values as one of the inputs to the key derivation function. If any of those files have been modified or tampered with, the keystore will not unlock. At this stage the process is complete.

Figure 18:
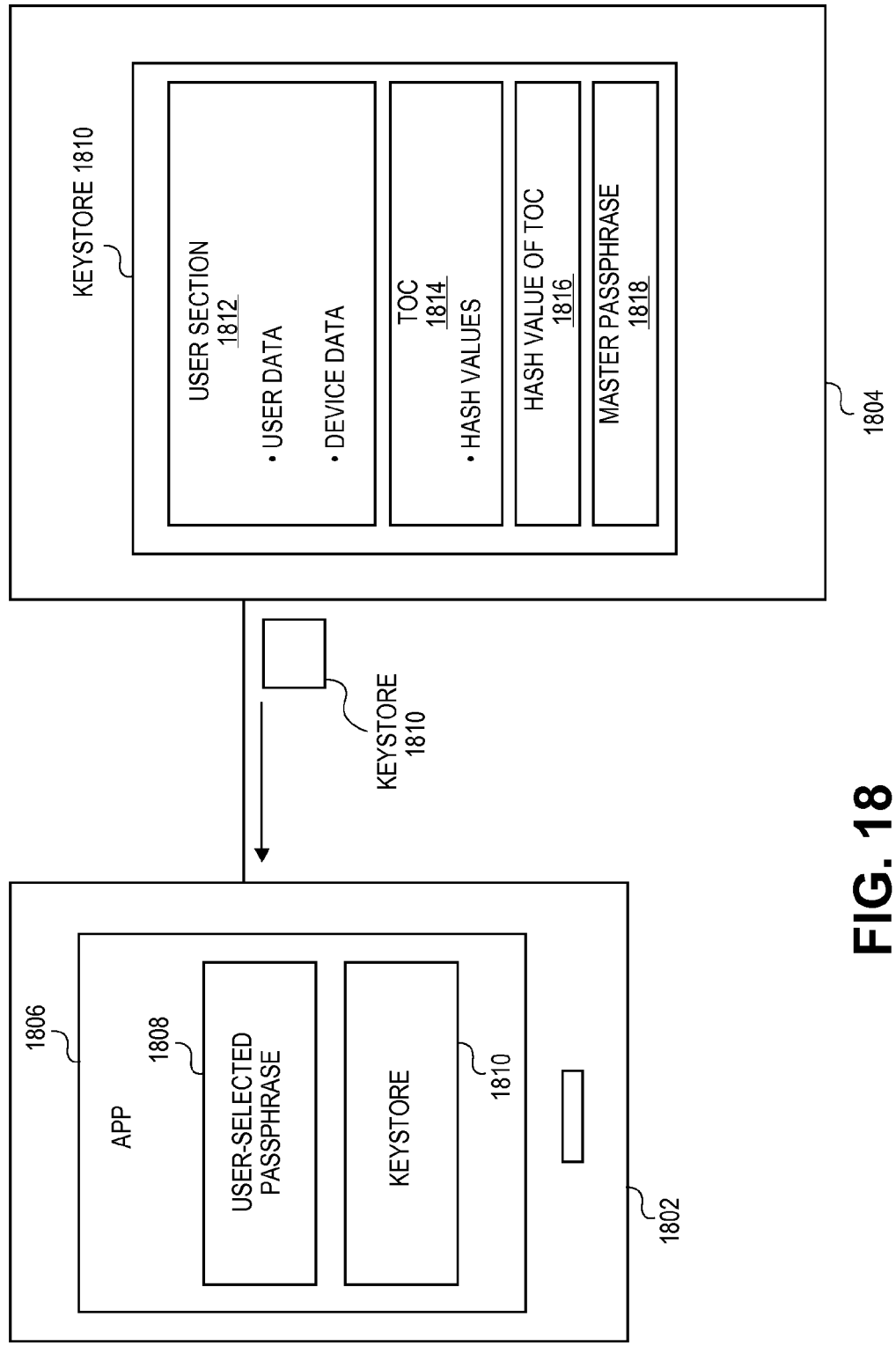
FIG. 18 is a block diagram of a mobile device and an app wrapping server in accordance with one embodiment.

FIG. 18 is a block diagram showing a mobile device and an app protection (wrapping) server in accordance with one embodiment. A mobile device 1802 is in communication with a server 1804 via the Internet or a cellular network. Mobile device 1802 has an app on it that is generic or non-provisioned (i.e., has no policies associated with it yet). A user is prompted to enter a passphrase 1808 that the user selects. App 1806 also has a keystore 1810.

Server 1804 (referred to as "server A" herein) creates keystore 1810 which has several components. One may be referred to as a user section 1812 which contains user data and device-specific data as described above. A TOC 1814 contains hash values of keystore files, such as files in user section 1812. Also stored in keystore 1810 is a hash value 1816 which is the hash of TOC 1816. Keystore 1810 also stores a master passphrase 1818 which is comprised of hash value 1816 and user-selected passphrase 1808, as described above. Keystore 1810 is then transmitted from server 1804 to mobile device 1802 and stored in app 1806.

Once the user has the initial keystore, they can unlock and use it normally by entering their passphrase. The app security wrapping code is responsible for hashing the user's files and transparently combining the hash with the user-provided passphrase. The resulting "big" passphrase is then used to unlock the keystore.

Any subsequent passphrase update by the user on the device requires the wrapped app to successfully hash the protected files in the keystore before the user's updated passphrase is accepted. Those same hashes are then added transparently as inputs to the key derivation function for the new updated passphrase. A "chain of trust" is maintained because no new passphrase can be created that does not use a verified version of those files. If an employer or an app security service provider wants to push new policies out to an employee or user, then the keystore is locked for the user and requires the user to perform the unlock/recovery procedure. In one embodiment, there is a way to time out an app or force an app to check in with either server A, server B, or another component, at some point in the process. In this manner, file hashes are used as part of the keystore passphrase because it enables verifying runtime files without intervention from the user or burdening the user with extra steps. Moving the keystore creation process off the device and onto a trusted, app protection server enables the start of a trust chain starting with the initial file hashes.

By moving the keystore creation off the app and onto a trusted remote app protection server (e.g., server A), the attack surface of an app is reduced. It is more secure and under control of an employer or app security service provider, thereby mitigating damage if the device is jail broken or if a hacker "snoops" around on the device. Apps are also made more secure by having a keystore initial passphrase created on a trusted app protection server and having all subsequent passphrase updates linked to the same chain of trust described above. The initial passphrase in this context is a combination of a user-selected passphrase and a file hash.

Part of the lockout and recovery protocol could involve sending the target device's ID to the app protection server (server A) so that it can be used as one of the inputs to the key derivation function. The target device ID may be the DID or UDID of the device or another technique may be used to uniquely identify the device, all of which would serve the purpose in this context. This ties the keystore to a specific device and creates barriers to someone attempting to crack the keystore on the device. These barriers play a more important role in Apple's iOS context if an iOS CPU internal key is used to indirectly generate a pseudo-device identifier. Android has a feature that can be used to securely store a unique key on a device known as the Trusted Execution Environment (TEE). As such, in another embodiment in which Android devices are used, TEE may be implemented to securely store keys on a device.

Following this method, an app is provisioned with policies, an initial keystore via an out-of-band procedure based on the challenge/response protocol and, optionally, a recovery passphrase.

As described above, the keystore is a secure memory location on a device, essentially a device-level vault. Once a user, typically the owner of a device, authenticates herself to the device, then the user can store data, such as keys (e.g., a back-up recovery passphrase), generic data blocks ("blobs"), and the like, in the keystore, in an encrypted format. As noted, in one embodiment a more secure keystore is implemented in which the service provider or the employer has more control of keystore creation and operation. In one embodiment, the keystore uses a randomized initial vector (random seed). The user is able to read and write generic data blocks or "blobs" in the keystore. In one example, there may be a policy that states that the user is not allowed to use, as a current passphrase any of the user's last n passphrases. In order to enforce this policy, hashes of the last n passphrases are stored so the device can check to see if the user is re-cycling recently used passphrases. When a user selects a new passphrase, the hash of the new passphrase is compared to the previous passphrase hashes. This is more secure than storing the actual passphrase history. In another embodiment, hashes are not taken of the last n passphrases. The comparison is done of the actual values. Other data may also need to be stored such as the date the last passphrase was changed. In one embodiment, these data are encrypted and stored in the keystore.

In another embodiment, there may be multiple passphrases to open specific portions of the keystore, such as user-specific areas. For example, there may be multiple DAR keys for the same keystore on a device, thereby supporting multiple tenants or login accounts for the same wrapped app, a higher level of granularity than enabling multiple users at the device level. For example, if one user logs into a device that supports multiple users (i.e., has logins for) and opens a wrapped app, such as a wrapped browser app, a second user (one who has not logged into the device which still has the first user logged in) can open and log in to the same wrapped browser app under the second user's login account. The second user can use the browser app under the second user's profile while the first user uses it under the first user's profile. As such, different versions of the same wrapped app can be used on a device regardless of device-level login, that is, regardless of which user initially logged onto the device. Depending on the passphrase used to login to the wrapped app, a user will get a specific DAR key x which would access certain portions of the keystore. Thus, by using multiple DAR keys two users sharing the same tablet and using the same security wrapped app would only see their own data with respect to the app. In another example, one user may have two different logins, one for personal use and one for work. Depending on which login account the user uses, a specific profile execute and the user can only access certain data (such as only work or personal data, but not both under one profile).

In another embodiment, apps that were not originally intended for multi-tenancy or multi-profile or have no internal implementation or structure for these features may be modified to include these features. However, these features can be implemented in the keystore itself. The wrapped app can be provisioned using different profiles. For example, an app may have a profile for a user that enables certain features during work hours or while the user is physically at work, such as copy and paste privileges. Outside those hours or a specific physical location (e.g., a building), a different profile is used for the same user that disables those features.

Although the content of files in the keystore are encrypted, certain file names themselves are not encrypted in the keystore of the present invention, while other file names are encrypted. For example, files that live in the app security provider program keystore (which may reside on server A) may have encrypted file names. However, encrypted files that are stored outside of the keystore may not have encrypted names. For example, if a user creates a document and stores it in an app's "Documents" folder or inside the app sandbox, that file will be encrypted but may not have an encrypted filename. However, the user's key files are encrypted in the keystore and their filenames are also encrypted. Encrypting file names not only provides additional security, but also allows for multiple login and multi-tenancy features for an app. The file names can be encrypted using a key derived from a user's passphrase. As described above, a passphrase is entered into a key generator, a key is generated and used to encrypt the file data and the file names. In another embodiment, two sets of keys are used for the encryption, one for the file content and the other for the file names.

In other words, the extensible keystore architecture of the present invention supports multiple, concurrent passphrases (for multiple users or a single user with multiple profiles) and multiple DAR keys without conflict. Using this structure, a wrapped app is enabled to support multiple accounts. For example, a user could use one passphrase to log into an app while in a work environment and a second passphrase to log into an app while in a home or personal environment. Using a secure Web browser again as an example, a user could have different proxy settings, bookmarks, and history for the same browser app depending on which passphrase was used to log into the app. Another example or use case involves multiple employees sharing the same device. Each employee may have his or her own passphrase and associated set of files within the app.

As noted above, a portion of the keystore is generated on server A and pushed to the device. This enables better handling of files that are not in the app and are not in executable form.

Presently, the user or employee selects a passphrase that is used to create a keystore on the device. However, this is not a trustworthy way of creating or managing the keystore because all operations (selecting passphrase, creating keystore, etc.) are done on the device itself. This is not preferred because these operations occur in an untrustworthy environment. It should not be assumed that the first person to run the app is trusted and is the user for whom the app was intended. In other words, until the intended user runs the app and picks a passphrase, the app is in a vulnerable state and can be used by anyone who gets to it first.

As such, a more secure way to generate a keystore is to generate it on the server (not on the device) and have it pushed to the device. In this embodiment, the app cannot run until the intended user initiates a provisioning request, is authenticated by their employer, and receives the necessary files from their employer. In an alternative embodiment, the server may select the passphrase. However, the user must then be informed of the initial passphrase in a secure way. In the embodiment described above, the user picks the initial passphrase so there is no need to communicate it back to the user through an insecure channel.

As noted, another issue that arises is protecting a file that is not in the app package or bundle. This issue may arise when an employer wants to change, revoke, or upgrade a policy for an employee. Presently, files are protected against tampering by hashing the files and injecting the hashes into an app security provider library in the app's bundle (package containing the executable and other files). This requires having to insert the file into an executable for the entire new application with changes injected into the executable. Files or file hash values are not injected into an app executable. This method has the limitation that only files that are known at the time of wrapping can be protected.

In one embodiment, all files are hashed and injected into a library in the app itself. In one embodiment, a special file is created in the keystore. This file may be referred to as a table-of-content (TOC) file. It contains a list of all files that should be protected and the hash values of each of those files. The important feature of the TOC file is that it is trusted. By checking the hash values, it is possible to see if anything in those files, which are in the app bundle, was changed. Two important steps take place: the TOC file is hashed and a keystore, or a portion of a keystore, is generated on a server that is trusted. In this manner, the server knows what the content of the TOC file should be and, if the server uses a hash of the TOC as part of the passphrase, then the user may enter a passphrase on the device which, in one embodiment, is the hash of the TOC and user's passphrase. If the TOC file is altered, the user is denied access. If the file changes, then the hash is different and access to the keystore is blocked. Login will fail if the TOC is modified. In this manner, it is possible to control updates made to the keystore, make updates to user policies, and maintain a train of trust for policy updates. This makes it possible to update policy files during runtime of the app on the device.

Figure 19A:
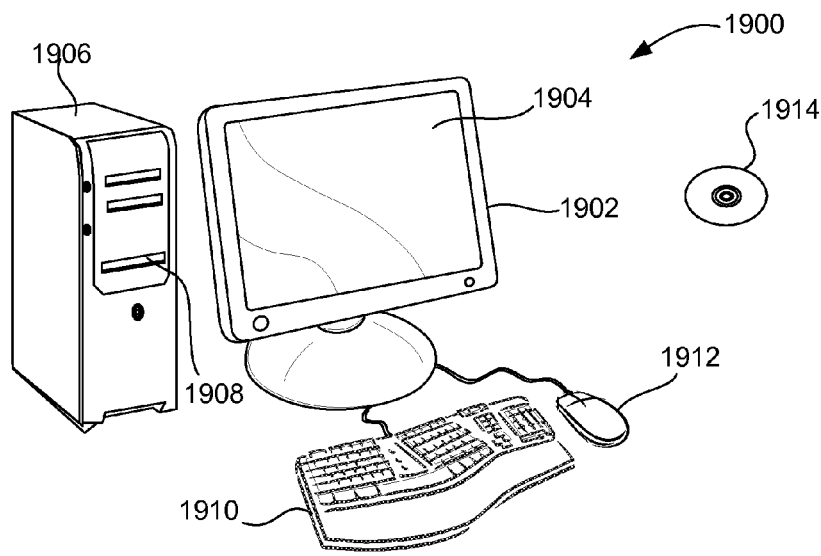
FIGS. 19A and 19B are block diagrams of a computing system suitable for implementing various embodiments of the present invention.
Figure 19B:
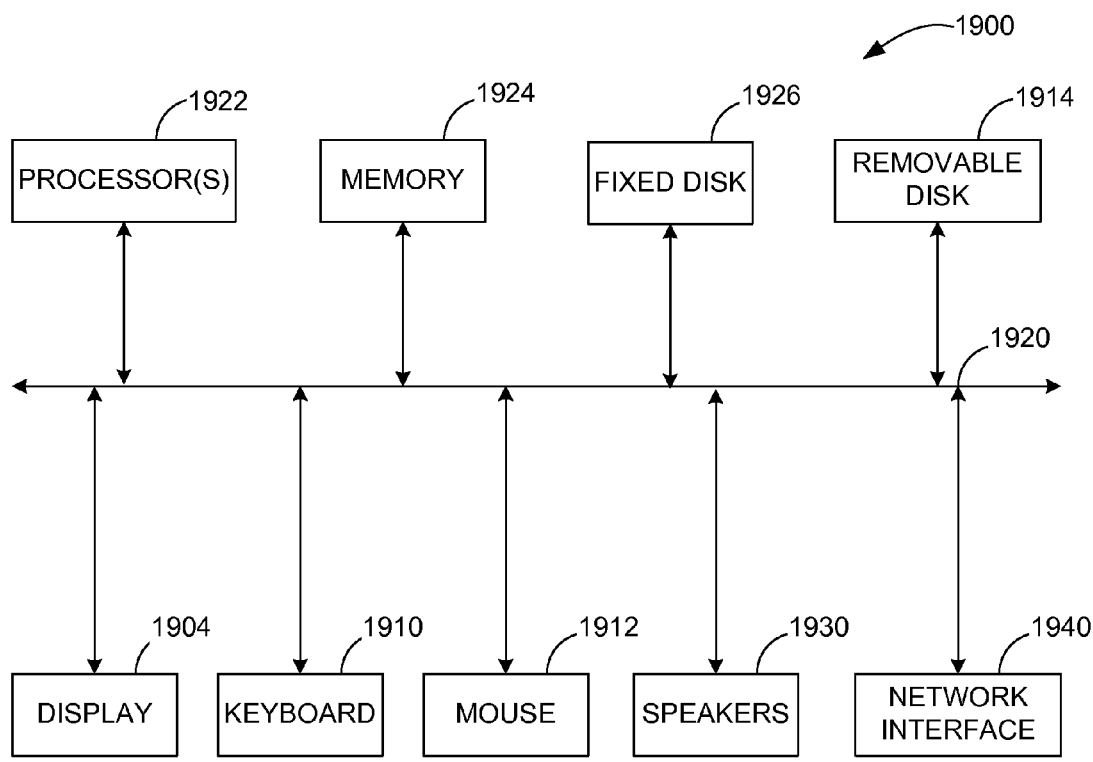

FIGS. 19A and 19B illustrate a generic computing system 1900, such as a mobile device, suitable for implementing specific embodiments of the present invention. Some of the devices that can be used in the present invention may have other features or components that are not shown in FIGS. 19A and 19B and not all the components shown in these figures (e.g., the keyboard) are needed for implementing the present invention. As such, FIG. 19A shows one possible physical implementation of a computing system as this term is broadly defined.

In one embodiment, system 1900 includes a display or screen 1904. This display may be in the same housing as system 1900. It may also have a keyboard 1910 that is shown on display 1904 (i.e., a virtual keyboard) or may be a physical component that is part of the device housing. It may have various ports such as HDMI or USB ports (not shown). Computer-readable media that may be coupled to device 1900 may include USB memory devices and various types of memory chips, sticks, and cards.

FIG. 19B is an example of a block diagram for computing system 1900. Attached to system bus 1920 is a variety of subsystems. Processor(s) 1922 are coupled to storage devices including memory 1924. Memory 1924 may include random access memory (RAM) and read-only memory (ROM). As is well known in the art, ROM acts to transfer data and instructions uni-directionally to the CPU and RAM are used typically to transfer data and instructions in a bi-directional manner. Both of these types of memories may include any suitable of the computer-readable media described below. A fixed disk 1926 is also coupled bi-directionally to processor 1922; it provides additional data storage capacity and may also include any of the computer-readable media described below. Fixed disk 1926 may be used to store programs, data and the like and is typically a secondary storage medium that is slower than primary storage. It will be appreciated that the information retained within fixed disk 1926, may, in appropriate cases, be incorporated in standard fashion as virtual memory in memory 1924.

Processor 1922 is also coupled to a variety of input/output devices such as display 1904 and network interface 1940. In general, an input/output device may be any of: video displays, keyboards, microphones, touch-sensitive displays, tablets, styluses, voice or handwriting recognizers, biometrics readers, or other devices. Processor 1922 optionally may be coupled to another computer or telecommunications network using network interface 1940. With such a network interface, it is contemplated that the CPU might receive information from the network, or might output information to the network in the course of performing the above-described method steps. Furthermore, method embodiments of the present invention may execute solely upon processor 1922 or may execute over a network such as the Internet in conjunction with a remote processor that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

What is claimed is:

1. A method of installing a keystore in an app on a mobile device, the method comprising:
  prompting a user to select a passphrase for the app;
  creating an app keystore with a user section and a table of contents ("TOC") on an app protection server;
  hashing keystore files, thereby creating a first keystore files hash value on the app protection server;
  storing first keystore files hash values in the TOC;
  hashing the TOC, thereby creating a TOC hash value;
  combining the passphrase with the TOC hash value;
  creating a first master passphrase for the keystore created on the app protection server from the combined passphrase and the TOC hash value;
  linking subsequent passphrase updates to a chain of trust including steps of said hashing of the TOC and said hashing of keystore files;
  transmitting the keystore from the app protection server to the app on a device, wherein an attack surface of the app is reduced by having creation of the keystore on the app protection server; and
  installing the keystore in the app.

2. A method as recited in claim 1 further comprising:
  embedding user and device specific policy files into the user section of the app keystore on the app protection server.

3. A method as recited in claim 1 further comprising:
  upon execution of the app on the device, hashing a user section of the TOC in the keystore creating a user section TOC hash value, wherein said hashing is done by the app.

4. A method as recited in claim 1 further comprising:
  combining the passphrase with user section TOC hash value to create a second master passphrase.

5. A method as recited in claim 1 further comprising:
  hashing the keystore, thereby creating a second keystore files hash value.

6. A method as recited in claim 5 further comprising:
  comparing the second keystore files hash value with the first keystore files hash value.

7. A method as recited in claim 1 wherein a cleartext version of the TOC is maintained.

8. A method as recited in claim 1 further comprising: initiating a challenge and response protocol.

* * * * *